(12) United States Patent
Depies et al.

(10) Patent No.: US 10,390,077 B2
(45) Date of Patent: Aug. 20, 2019

(54) COLLECTIVE DETERMINATION OF INTERESTING PORTIONS OF A MEDIA PRESENTATION, MEDIA TAGGING AND JUMP PLAYBACK

(71) Applicant: The DIRECTV Group, Inc., El Segundo, CA (US)

(72) Inventors: Michael Edward Depies, Lawndale, CA (US); Sarah M. Lyons, Encino, CA (US); Aaron Louis Goldstein, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/459,225

(22) Filed: Mar. 15, 2017

(65) Prior Publication Data
US 2018/0270527 A1    Sep. 20, 2018

(51) Int. Cl.
*H04N 21/25* (2011.01)
*H04N 21/44* (2011.01)
(Continued)

(52) U.S. Cl.
CPC ..... *H04N 21/4334* (2013.01); *H04N 21/2387* (2013.01); *H04N 21/252* (2013.01); *H04N 21/4147* (2013.01); *H04N 21/4316* (2013.01); *H04N 21/4532* (2013.01); *H04N 21/4756* (2013.01); *H04N 21/47217* (2013.01);
(Continued)

(58) Field of Classification Search
None
See application file for complete search history.

(56) References Cited

U.S. PATENT DOCUMENTS 7,548,565 B2    6/2009 Sull et al.
7,757,171 B1    7/2010 Wong et al.
(Continued)

FOREIGN PATENT DOCUMENTS

WO    WO 2016/054916    4/2016

OTHER PUBLICATIONS

"How to Use Clips," Twitch, Dec. 15, 2016, retrieved at https://help.twitch.tv/customer/portal/articles/2442508-how-to-use-clips.
(Continued)

*Primary Examiner* — James R Marandi
(74) *Attorney, Agent, or Firm* — Hartman & Citrin LLC

(57) ABSTRACT

Concepts and technologies are disclosed herein for collective determination of interesting portions of a video program, video tagging, and jump playback within the video program. A processor can obtain interest inputs for video content associated with a video program and can send the information to an aggregator server. The aggregator server can collect and analyze the information, determine interest indications for interesting portions of the video program, generate metadata, and send the metadata to devices. Devices can use the metadata to enable jump functionality. The metadata can be correlated with recorded content that corresponds to the video program to indicate interesting portions of the recorded content. A user interface can be presented. The user interface can include a timeline for the video program and controls to navigate to portions of the video program that are indicated as interesting by the metadata.

20 Claims, 13 Drawing Sheets

(51) Int. Cl.
*H04N 21/45* (2011.01)
*H04N 21/84* (2011.01)
*H04N 21/431* (2011.01)
*H04N 21/433* (2011.01)
*H04N 21/472* (2011.01)
*H04N 21/475* (2011.01)
*H04N 21/2387* (2011.01)
*H04N 21/4147* (2011.01)
*H04N 21/4725* (2011.01)
*H04N 21/8545* (2011.01)

(52) U.S. Cl.
CPC ......... *H04N 21/84* (2013.01); *H04N 21/8545* (2013.01); *H04N 21/44008* (2013.01); *H04N 21/4725* (2013.01)

(56) References Cited

U.S. PATENT DOCUMENTS

| | | | |
|---|---|---|---|
| 8,230,343 B2 | 7/2012 | Logan et al. | |
| 8,437,620 B2 | 5/2013 | Schlieski et al. | |
| 8,705,933 B2 | 4/2014 | Eyer | |
| 8,799,300 B2 | 8/2014 | Saretto et al. | |
| 8,861,935 B2 | 10/2014 | Murthy et al. | |
| 8,891,936 B2 | 11/2014 | Barrett | |
| 8,914,826 B2 | 12/2014 | Ruiz-Velasco et al. | |
| 9,002,175 B1 | 4/2015 | Raj | |
| 9,179,096 B2 | 11/2015 | Denoue et al. | |
| 9,319,724 B2 | 4/2016 | Lewis, II et al. | |
| 9,357,268 B2 | 5/2016 | Zises | |
| 9,396,763 B2 | 7/2016 | Syed et al. | |
| 9,531,987 B1 | 12/2016 | Melo | |
| 2002/0065678 A1 | 5/2002 | Peliotis et al. | |
| 2005/0185921 A1 | 8/2005 | Skran et al. | |
| 2006/0218573 A1 | 9/2006 | Proebstel | |
| 2009/0162024 A1 | 6/2009 | Bradicich et al. | |
| 2012/0183271 A1 | 7/2012 | Forutanpour et al. | |
| 2012/0189273 A1 | 7/2012 | Folgner et al. | |
| 2013/0091299 A1* | 4/2013 | Wei | G06F 3/0481 709/231 |
| 2014/0274297 A1 | 9/2014 | Lewis et al. | |
| 2014/0321831 A1 | 10/2014 | Olsen et al. | |
| 2014/0373079 A1 | 12/2014 | Friedrich et al. | |
| 2015/0095937 A1 | 4/2015 | Tobin | |
| 2015/0181301 A1 | 6/2015 | Bloch et al. | |
| 2016/0094875 A1 | 3/2016 | Peterson et al. | |
| 2017/0257410 A1* | 9/2017 | Gattis | H04L 65/4092 |

OTHER PUBLICATIONS

Cattelan et al., "Watch-and-Comment as a Paradigm toward Ubiquitous Interactive Video Editing," ACM Transactions on Multimedia Computing, Communications and Applications, Oct. 2008, vol. 4, No. 4.

Cesar et al., "Fragment, Tag, Enrich, and Send: Enhancing Social Sharing of Video," ACM Transactions on Multimedia, Computing, Communications and Applications, Aug. 2009, vol. 5, No. 3, Article 19.

* cited by examiner

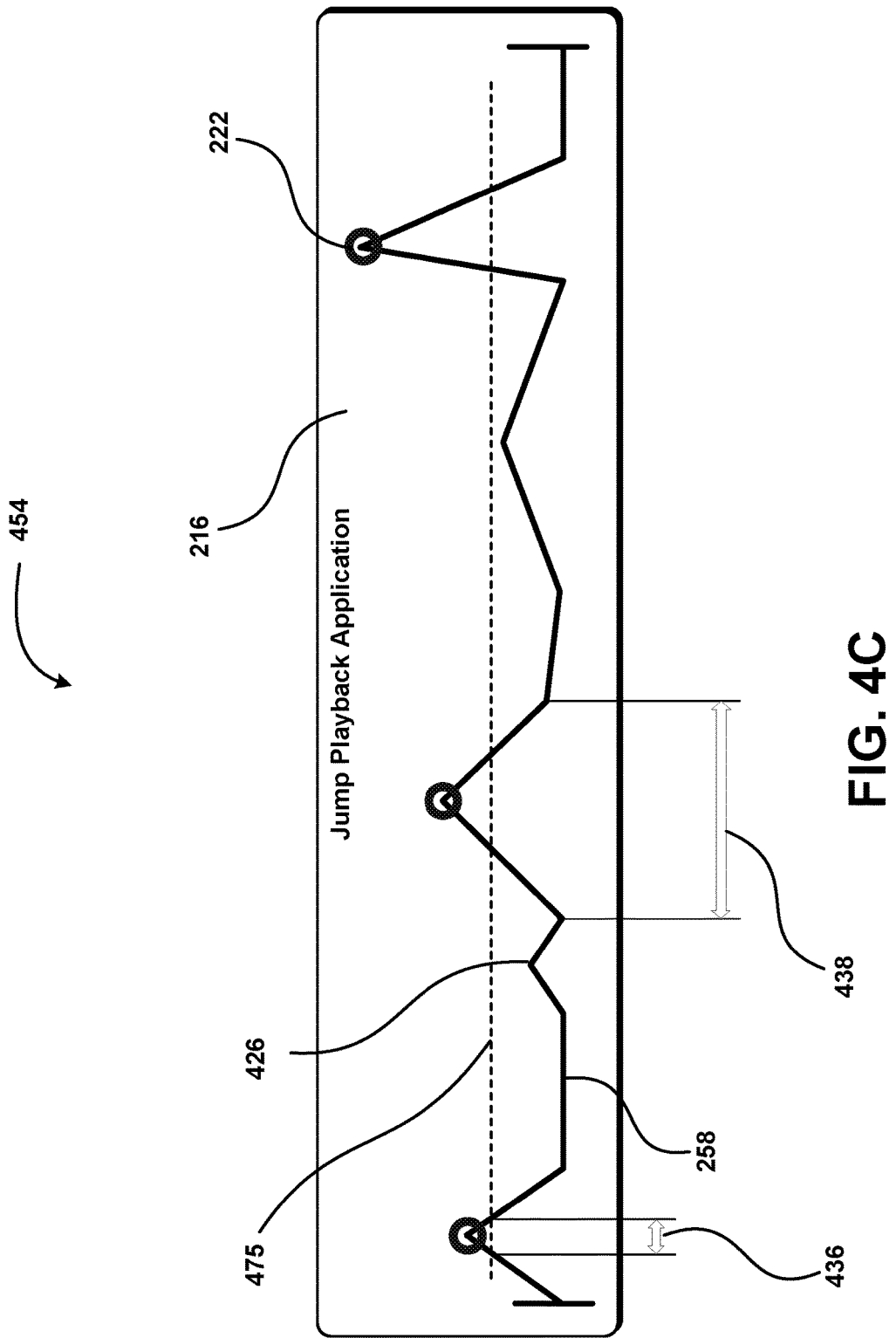

COLLECTIVE DETERMINATION OF INTERESTING PORTIONS OF A MEDIA PRESENTATION, MEDIA TAGGING AND JUMP PLAYBACK

BACKGROUND

Conventional personal video recording and playback devices (PVRs) can allow users to record video content and to control playback of recorded content including starting, stopping, pausing playback, and scrubbing (e.g., moving forward and backward) through the recorded content. The video content can be obtained from a content delivery system or other source, such as a video camera or other video capture device, and can be transmitted in various manners including via radio waves, such as over-the-air television transmissions, satellite television transmissions, Internet-based transmissions, cable television transmissions, or other manners.

SUMMARY

The present disclosure is directed to collective determination of interesting portions of a media presentation, media tagging, and enabling jumps during playback of the media presentation to times in the playback associated with the interesting portions. As used herein, the term jump is used to refer to scrubbing to a specific time in the playback, for example a moment of time (hereinafter referred to as a "moment") or period in media content that has been identified as being "interesting." As used herein, the term "interesting" is used to refer to a moment or period in media content that, relative to other moments or periods in the media content, have an increased level of interest. In some embodiments, the increased level of interest can be determined based on feedback from one or more viewers of the media content, though this is not necessarily the case. Moments of interest in a video program can be determined, for example, based on user inputs while viewing the program, for which users can be provided with interactive options to provide input regarding their interest in portions of the program. In some instances, a user can be prompted to push a particular button on a remote control or other input/output device to indicate their interest in a portion of the program. The input can be provided to an aggregator, such as a server providing aggregator functionality. The aggregator can determine periods of interest in the program based on the input. The aggregator also can generate metadata for the program. The metadata can indicate a relative or absolute level of interest at a particular time or time period within the program. The metadata can be stored and/or can be provided to devices accessing or storing recorded portions of the program. The devices can use the metadata to present one or more user interfaces. In some embodiments, the devices can merge (e.g., correlate, combine, or otherwise match) the metadata with stored recorded portions of the program for use during playback of the video content, though this is not necessarily the case.

A playback device can provide a user interface. The user interface can display selectable indications of interesting portions of the program on or with a timeline for the program. The user interface also can provide an option to jump to an interesting portion of the program. Upon selection of an indication of an interesting portion of the program ("jump option"), the playback device can commence playback of a corresponding portion of the program. In addition, upon selection of the jump option, the playback device can jump to and commence playback of another portion of the program, which can correspond with the next indication of an interesting portion that can be shown in the user interface timeline. The user interface can also allow the user to provide inputs indicating their interest in portions of the program while they are watching playbacks of the interesting portions, which can be sent to the aggregator to allow for updating of the indications of interesting portions based on updated data and additional inputs obtained from viewers.

According to one aspect of the concepts and technologies disclosed herein, a device is disclosed. The device can include a processor and a memory. The memory can store computer-executable instructions that, when executed by the processor, cause the processor to perform operations. The operations can include receiving, from a first server, video content that corresponds to a program. The program has a duration including an amount of time, and the video content includes a time index based on the amount of time. The operations can further include receiving, from a second server, metadata associated with the program. The metadata can include data that defines a first amount of interest in the program at a first period within the program along the time index of the program, and a second amount of interest in the program at a second period within the program along the time index of the program.

The operations can further include recording a portion of the video content, storing the portion of the video content, and generating, based on the metadata, a user interface. The user interface can include a representation of the duration and a first indication at a first location on the representation of the duration. The first indication can represent the first amount of interest and the first location can correspond to the first period. The user interface can further include a second indication at a second location on the representation of the duration. The second indication can represent the second amount of interest and the second location can correspond to the second period.

In some embodiments, the first server can include a content server and the second server can include an aggregator. Further, in some embodiments, the second server can generate the metadata the device receives. Generating the metadata can include receiving, at the second server and from two or more entities including the device and two or more other devices, information describing two or more interest inputs for the program and the two or more entities, in which one or more interest inputs can indicate a moment of interest in the program at a corresponding input period along the time index of the program. Generating the metadata can further include aggregating, at the second server, the two or more interest inputs in the information; determining, at the second server, amounts of interests in the program along the time index of the program; and establishing two or more periods of high amounts of interest in the program along the time index of the program.

One or more of the two or more periods can include a starting point along the time index, a period length, and an amount of interest for the period. The two or more periods can include the first period and the second period. In addition, the second server generating the metadata can also include the second server creating the metadata for the program. The metadata can include data that defines the first amount of interest in the program at the first period along the time index of the program for a first one of the two or more periods, and a second amount of interest in the program at a second period along the time index of the program for a second one of the two or more periods.

In some embodiments of the device, the operations can include providing the program to a video display. The operations can further include, while providing the program to the video display, receiving an interest input from an input/output device. The interest input can indicate a moment of interest in the program. The operations can further include sending, to the second server, input information describing the interest input and the input period along the time index of the program.

In some other embodiments of the device, the operations can include merging the metadata received from the second server with the stored portion of the video content of the program, and providing the stored portion of the video content of the program to the video display along with a user interface. The user interface can include a program timeline based on the time index and amounts of interest in the program along the timeline according to the metadata. The user interface can also show the first indication at the first location and the second indication at the second location. The user interface also can identify the first indication and the second indication as being selectable items in the user interface. The operations performed can also include, in response to receiving a selection input selecting one of the first indication or the second indication, commencing playback of the stored portion of the video content of the program at a beginning of one of the first period or the second period that corresponds to a selected one of the first indication or the second indication.

In some other embodiments of the device, the operations can additionally include, receiving a jump selection input indicating a preference to jump to another period. The jump selection input can include a general jump selection input that, for the jump to another period, includes a next sequential period that is located sequentially next in the timeline after the currently-playing period. The jump selection can also include a specific jump selection input that, for the jump to another period, includes a specifically selected period corresponding with one of the first indication on the timeline, the second indication or another indication on the timeline. The operations can further include, in response to receiving the jump selection input, terminating playback of a stored portion of the video content for a currently-playing period. In addition, the operations in response to receiving the jump selection input can also include commencing playback at a beginning of another period.

According to another aspect, a method is disclosed. The method can include receiving, at a device, from a first server, video content that corresponds to a program. The program has a duration including an amount of time, and the video content includes a time index based on the amount of time. The method can further include receiving, at the device, from a second server, metadata associated with the program. The metadata can include data that defines a first amount of interest in the program at a first period within the program along the time index of the program, and a second amount of interest in the program at a second period within the program along the time index of the program.

The method can further include recording, at the device, a portion of the video content, storing the portion of the video content, and generating, at the device, based on the metadata, a user interface. The user interface can include a representation of the duration and a first indication at a first location on the representation of the duration. The first indication can represent the first amount of interest and the first location can correspond to the first period. The user interface can further include a second indication at a second location on the representation of the duration. The second indication can represent the second amount of interest and the second location can correspond to the second period.

In some embodiments, the first server can include a content server and the second server can include an aggregator. Further, in some embodiments, the second server can generate the metadata the device receives. Generating the metadata can include receiving, at the second server and from two or more entities including the device and two or more other devices, information describing two or more interest inputs for the program and the two or more entities, in which one or more interest inputs can indicate a moment of interest in the program at a corresponding input period along the time index of the program. Generating the metadata can further include aggregating, at the second server, the two or more interest inputs in the information; determining, at the second server, amounts of interests in the program along the time index of the program; and establishing two or more periods of high amounts of interest in the program along the time index of the program.

One or more of the two or more periods can include a starting point along the time index, a period length, and an amount of interest for the period. The two or more periods can include the first period and the second period. In addition, the second server generating the metadata can also include the second server creating the metadata for the program. The metadata can include data that defines the first amount of interest in the program at the first period along the time index of the program for a first one of the two or more periods, and a second amount of interest in the program at a second period along the time index of the program for a second one of the two or more periods.

In some embodiments, the method can include providing the program to a video display. The method can further include, while providing the program to the video display, receiving an interest input from an input/output device. The interest input can indicate a moment of interest in the program. The method can further include sending, to the second server, input information describing the interest input and the input period along the time index of the program.

In some other embodiments of the device, the method can include merging, at the device, the metadata received from the second server with the stored portion of the video content of the program, and providing the stored portion of the video content of the program to the video display along with a user interface. The user interface can include a program timeline based on the time index and amounts of interest in the program along the timeline according to the metadata. The user interface can also show the first indication at the first location and the second indication at the second location. The user interface also can identify the first indication and the second indication as being selectable items in the user interface. The method can also include, in response to receiving a selection input selecting one of the first indication or the second indication, commencing playback of the stored portion of the video content of the program at a beginning of one of the first period or the second period that corresponds to a selected one of the first indication or the second indication.

In some other embodiments of the device, the method can additionally include, receiving, at the device, a jump selection input indicating a preference to jump to another period. The jump selection input can include a general jump selection input that, for the jump to another period, includes a next sequential period that is located sequentially next in the timeline after the currently-playing period. The jump selection can also include a specific jump selection input that, for the jump to another period, includes a specifically selected period corresponding with one of the first indication on the timeline, the second indication or another indication on the timeline. The method can further include, in response to receiving the jump selection input, terminating, at the device, playback of a stored portion of the video content for a currently-playing period. In addition, the method in response to receiving the jump selection input can also include commencing playback, at the device, at a beginning of another period.

According to yet another aspect of the concepts and technologies disclosed herein, a computer storage medium is disclosed. The computer storage medium can store computer-executable instructions that, when executed by a processor, cause the processor to perform operations. The operations can include receiving, at a device, from a first server, video content that corresponds to a program. The program has a duration including an amount of time, and the video content includes a time index based on the amount of time. The operations can further include receiving, at the device, from a second server, metadata associated with the program. The metadata can include data that defines a first amount of interest in the program at a first period within the program along the time index of the program, and a second amount of interest in the program at a second period within the program along the time index of the program.

The operations can further include recording, at the device, a portion of the video content, storing the portion of the video content, and generating, at the device, based on the metadata, a user interface. The user interface can include a representation of the duration and a first indication at a first location on the representation of the duration. The first indication can represent the first amount of interest and the first location can correspond to the first period. The user interface can further include a second indication at a second location on the representation of the duration. The second indication can represent the second amount of interest and the second location can correspond to the second period.

In some embodiments, the first server can include a content server and the second server can include an aggregator. Further, in some embodiments, the second server can generate the metadata the device receives. Generating the metadata can include receiving, at the second server and from two or more entities including the device and two or more other devices, information describing two or more interest inputs for the program and the two or more entities, in which one or more interest inputs can indicate a moment of interest in the program at a corresponding input period along the time index of the program. Generating the metadata can further include aggregating, at the second server, the two or more interest inputs in the information; determining, at the second server, amounts of interests in the program along the time index of the program; and establishing two or more periods of high amounts of interest in the program along the time index of the program.

One or more of the two or more periods can include a starting point along the time index, a period length, and an amount of interest for the period. The two or more periods can include the first period and the second period. In addition, the second server generating the metadata can also include the second server creating the metadata for the program. The metadata can include data that defines the first amount of interest in the program at the first period along the time index of the program for a first one of the two or more periods, and a second amount of interest in the program at a second period along the time index of the program for a second one of the two or more periods.

In some embodiments, the operations can include providing the program to a video display. The operations can further include, while providing the program to the video display, receiving an interest input from an input/output device. The interest input can indicate a moment of interest in the program. The operations can further include sending, to the second server, input information describing the interest input and the input period along the time index of the program.

In some other embodiments of the device, the operations can include merging, at the device, the metadata received from the second server with the stored portion of the video content of the program, and providing the stored portion of the video content of the program to the video display along with a user interface. The user interface can include a program timeline based on the time index and amounts of interest in the program along the timeline according to the metadata. The user interface can also show the first indication at the first location and the second indication at the second location. The user interface also can identify the first indication and the second indication as being selectable items in the user interface. The operations can also include, in response to receiving a selection input selecting one of the first indication or the second indication, commencing playback of the stored portion of the video content of the program at a beginning of one of the first period or the second period that corresponds to a selected one of the first indication or the second indication.

In some other embodiments of the device, the operations can additionally include, receiving, at the device, a jump selection input indicating a preference to jump to another period. The jump selection input can include a general jump selection input that, for the jump to another period, includes a next sequential period that is located sequentially next in the timeline after the currently-playing period. The jump selection can also include a specific jump selection input that, for the jump to another period, includes a specifically selected period corresponding with one of the first indication on the timeline, the second indication or another indication on the timeline. The operations can further include, in response to receiving the jump selection input, terminating, at the device, playback of a stored portion of the video content for a currently-playing period. In addition, the operations in response to receiving the jump selection input can also include commencing playback, at the device, at a beginning of another period.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIGS. 4A-4C are user interface diagrams showing various screen displays or portions thereof, according to some illustrative embodiments of the concepts and technologies described herein.

DETAILED DESCRIPTION

Figure 1A:
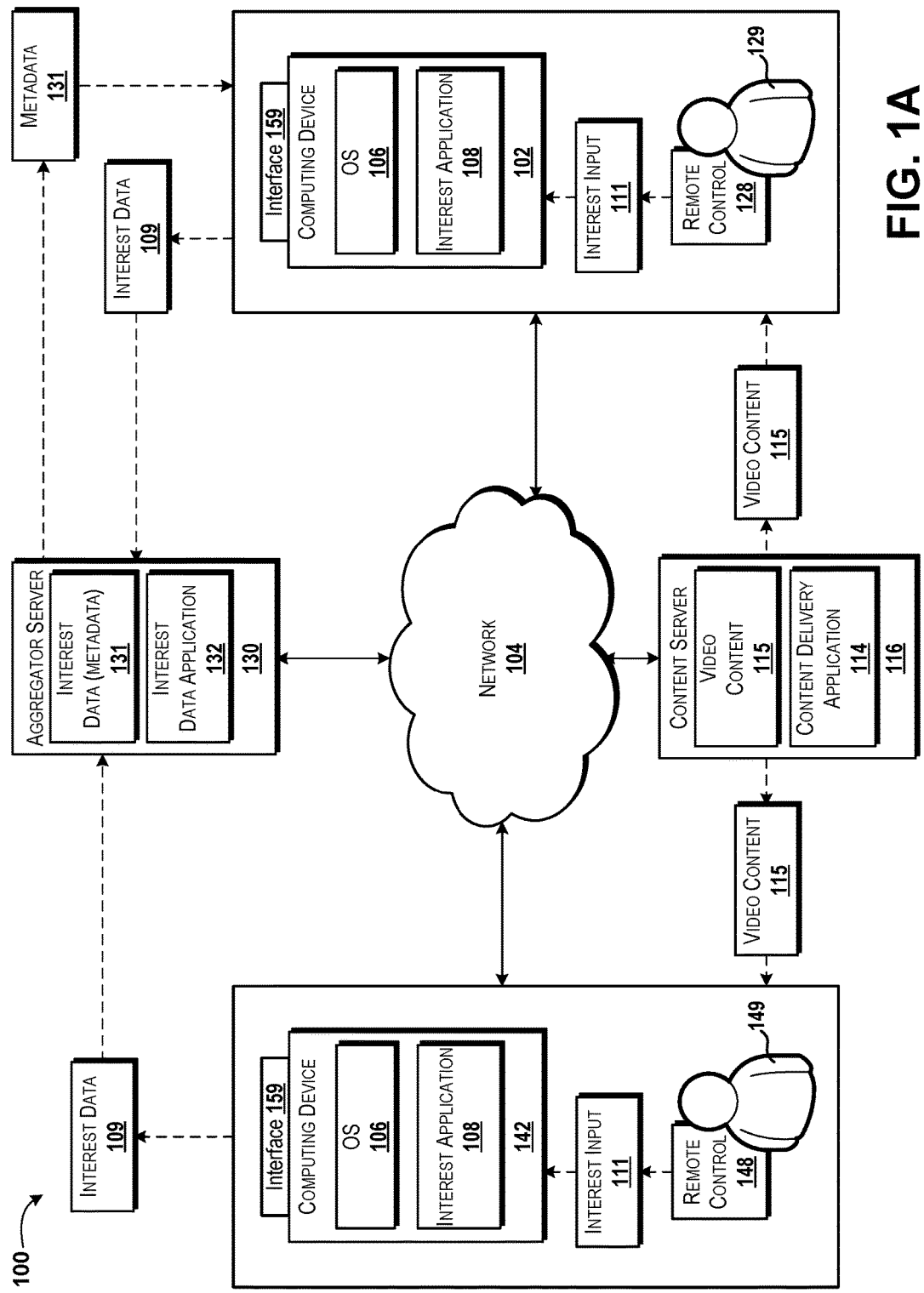
FIG. 1A is a system diagram of an illustrative operating environment for various embodiments of the concepts and technologies described herein.

The following detailed description is directed to concepts and technologies for collective determination of interesting portions of a media presentation, media tagging and jump playback. Further, the detailed description is directed to concepts and technologies for identifying and marking interesting moments and portions of a program, and for allowing users to jump between identified interesting moments and portions of the program, which are described by way of example configurations that illustrate various aspects and features of tagging interesting portions and jump playback. The systems and devices illustrated and described herein can include, for example, content delivery systems, set-top boxes (STB), digital video recorders (DVRs), other devices as illustrated and described herein, and the like.

According to various embodiments of the concepts and technologies disclosed herein, interesting portions of a program can be determined based on inputs from one or more users while viewing the program. In some embodiments, users can be provided with interactive options to provide inputs regarding interesting portions of the program. For instance, set-top boxes and other interactive program guides can provide users with prompts and options for providing inputs for portions of the program they like, dislike, or find interesting such as via a remote control or other user input device. In one arrangement, the set-top box can prompt a user to push a particular button on the remote, such as the up-arrow button or a dedicated button, to indicate a portion of the program they like. The set-top box can capture the indication along with data that can define a point in the program (time) at which this indication was created. The set-top box can relay the indication and the data to a device (e.g., a service or application on a network). The service or application can store this data. Based on this information and information collected from one or more other users (set-top boxes or other devices), the service or application can determine the interesting portions of a program and store information that identifies those interesting portions as metadata. The metadata can be associated with content that corresponds to the program.

In some embodiments, user inputs can be aggregated and evaluated against one or more parameters to determine interesting portions of a program. For example, a certain threshold (e.g., a number or percentage) of interest inputs can be set as a parameter for identifying an interesting moment or portion of a program, which can be different for different programs and types of programs. An interesting moment can have a default length, such as thirty seconds from the point in the program identified by users as interesting, or a default period before and after that point, such as, for example, ten seconds prior to and twenty seconds after the interesting point that has been identified by users. It should be understood that these examples are illustrative, and therefore should not be construed as being limiting in any way.

In some other embodiments, the interesting moment may not have a default length and/or may be determined to end at a next scene, chapter, or the like, associated with the program. Further, in some embodiments interesting moments can continue for an indefinite period and extend until the amount of user inputs drops below a threshold. A drop under the threshold can identify an end point or break point between interesting moments. In some embodiments, inputs can be received while one or more viewers watch a live version of the program and/or when one or more users watch on-demand versions of the program and/or recorded versions of the program. As such, interesting moments for a program can change over time as more data is collected from more users watching the program and providing additional inputs, though this is not necessarily the case.

Also, because multiple users may have different reaction times and/or because levels of interests may differ for particular users (relative to one another) before a particular user may indicate a moment as being interesting, the server or application can use various algorithms to interpret the time information associated with the indication of an interesting moment to identify a start time associated with the interesting moment. For example, the application or service may use a distribution curve that can cover indications of an interesting moment and may specify the time associated with the beginning of an associated interesting moment as a mean, average, or other statistically-defined point based on the various time indications received from multiple users. It should be understood that this example is illustrative, and therefore should not be construed as being limiting in any way.

Programs can be marked with interesting moments by a content provider or third party (e.g., the application or service as noted above). The content provider or third party can receive the collective user input data and/or determine, based on the collective user input, one or more interesting moments based on the inputs and parameters for determining the same. Also, a local application can determine interesting moments for a set of users selected by the user, such as based on inputs from users within a household or from a selected group of friends.

When content is provided to the set-top box or other device for viewing, the content can be provided with metadata that defines or identifies the interesting moments. The metadata can include time information, titles, and/or descriptions of the moments, numbers of users who indicated the moment as interesting, etc. In some embodiments, the metadata can define interest only for the moments of significance, while in some other embodiments the metadata can define an associated interest for the entire program (e.g., each second of the program). The interesting moments can be defined as the peaks of interest during the program. In either case (or in both cases), the content and the metadata can be provided to the set-top box or other device by a single server or device, or by multiple devices. Thus, one or more servers (e.g., a content server, a metadata server or aggregator, etc.) can operate as callable services that can provide content and/or metadata on demand and/or in response to a request. Also, the metadata can be stored with identifiers or keys that can associate the metadata with the content, in some embodiments.

A crowd interest application playback application can be implemented on a computer device to enable interest application functionality during playback of a program as illustrated and described herein. The interest application functionality can include showing identified interesting moments to a user during playback. In some embodiments, the application can generate and/or present jump locations along a playback indicator displayed on a screen during playback and/or present other user interfaces as illustrated and described herein.

In one arrangement, the playback indicator and the jump locations can indicate to a user or other entity the relative amounts of inputs collectively received while previous users watched the program. As such, the playback indicator can have at least two dimensions as opposed to a traditional single-dimension timeline associated with playback of a program. For example, the playback indicator can include a vertical component in a vertical axis, where the vertical component can indicate average viewer interest at a corresponding time (e.g., a time along a horizontal axis) associated with the program. Spikes in the interest can correspond to (and/or can be defined as) jump locations. During playback, the user can indicate portions of the program they find interesting in the same or in a similar manner as previous viewers, such as by pressing a designated button on the remote during likable, dislikable, and/or interesting portions of the program. The user's inputs can be added to the preexisting set of inputs received to determine updated jump locations for future viewers.

During playback of the program, the user can jump between interesting moments of the program by pressing a designated jump button on the remote control. This ability to jump to an interesting moment can allow a user or other entity to save time and to quickly view an interesting portion of the program as determined by previous viewers. Users can be provided with additional options, such as jumping between jump points in a selected order, such as from a most interesting moment to a least interesting moment, or by jumping in time-order through the program's jump points (which can correspond to the interesting moments). Additionally, or alternatively, users can be provided with options, such as double clicking the designated jump button on the remote control to automatically jump through some or all interesting moments/jump points within the program in time-order as each interesting moment is completed. In some other embodiments, a number can be associated with each of the interesting moments, and a user can select a moment of interest based on the number (or other indicator) to jump to that moment without having to press the designated jump button repeatedly. Examples of a user interface for presenting interest with respect to time are illustrated and described herein, particularly with reference to FIGS. 2A-2B and 4A-4C.

As used herein, a program can include a substantially continuous segment of video content (in some cases the program may not include breaks for commercials and the like). A program can have a common theme, event, or storyline, and can be intended for broadcast or distribution as a unit. Thus, a program can correspond to a movie, a television show, an event, or the like. As used herein, a "moment" as used with reference to a program can include a time period in or other portion of a program such as, for example, a second of program content or a few seconds of the program content. As used herein, a "period" as used with reference to a program can include two or more moments. Thus, the periods can include portions of the program that can last from a number of seconds to a number of minutes of the program. Interest in a moment or period in a program can be a moment or period of a program that appeals to a viewer as a desirable moment or period; a moment or period that catches attention and during which they are attentive; a captivating moment or period that is entertaining, controversial or otherwise fascinating whether appealing to the user in a positive manner or not; combinations thereof; or the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 for various embodiments of the concepts and technologies will be described. As shown in FIG. 1A, the operating environment 100 can include a first computing device 102, a second computing device 142, a network 104, a first server computer configured as a content server 116, and a second server computer configured as an aggregator server 130. It should be understood, however, that various implementations of the operating environment 100 can include zero, one, or more than one computing device 102, 142; zero, one, or more than one network 104; and zero, one, or more than one server computer 116, 130. As such, the illustrated embodiment should be understood as being illustrative, and should not be construed as being limiting in any way.

The functionality of the computing device 102 can be provided by a set top box (STB), a set-top unit or other customer premises equipment (CPE), or other computing device. In some embodiments, the computing device 102 can be owned and/or operated by a carrier, for example a carrier that can provide video content 115 and related communications to the computing device. The computing device 102 can operate in communication with and/or as part of the communications network ("network") 104, though this is not necessarily the case. According to various embodiments, the functionality of the computing device 102 may be provided by multiple set-top boxes or other CPE, mobile telephones, laptop computers, smartphones, tablet computers, slate computers, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a set-top box (STB). One example embodiment of an architecture for the computing device 102 is illustrated and described in detail below with reference to FIG. 6. It should be understood that this embodiment is illustrative, and should not be construed as being limiting in any way.

The computing device 102 can execute an operating system 106 and one or more application programs such as, for example, a video content-interactive "interest application" and/or a playback "jump application," which can be aspects of one or more application program. In the illustrated embodiment, the functionality associated with the interest application and the playback jump application are included in a single application program, which is labeled as the "interest application 108" in FIG. 1A. The interest application 108 can further be part of, or provide the functions of, a media content player/controller application (not shown) of the computing device 102, which can provide the video content 115 received from the content server 116 to a video display (not shown) connected to the computing device 102. The interest application 108 can also provide functionality related to capturing an amount of interest of the user or other entity in portions of the program while the user views video content. The interest application 108 also can include a module, routine, or other instructions for providing an interest application display generator. Additional functionality of the interest application 108 will be described in more detail below after introducing additional aspects of the operating environment 100.

The operating environment 100 also can include one or more server computer such as the server computers 116, 130. The server computers 116, 130 can include one or more of the server computers illustrated and described herein with reference to FIG. 6, for example. Thus, it can be appreciated that the server computers 116, 130 can include various types of hardware and/or software for supporting communications at or near any portion of the network 104, and/or for providing support and functionality for aspects and features discussed herein pertaining to collecting, determining, and presenting interesting portions of programs. For instance, as discussed in greater detail below, the content server 116 is illustrated as an example server computer that can be configured to provide video content to one or more computing devices, e.g., the devices shown in the operating environment 100. The aggregator server 130 is illustrated as an example server computer that can be configured to perform actions related to collecting interest data that relates to programs from one or more devices or entities, creating metadata that reflects the interest in the programs and/or portions thereof, and/or providing the metadata (associated with particular programs) to one or more computing devices, e.g., the devices shown in the operating environment 100. In the illustrated embodiment, the server computers 116, 130 can include hardware and software for supporting communications over a geographic area or other portion of a communications network such as the network 104. It should be understood that this example is illustrative and therefore should not be construed as being limiting in any way.

In addition to controlling the presentation of video content to a user, the interest application 108 can also provide an interest application user interface 214 (see FIGS. 2A, 2B) to allow the user to indicate, in an interactive manner (e.g., while viewing the program), any moments in the program that the user considers to be of interest. In some configurations, the interest application 108 can be configured to receive one or more interest inputs 111 from a remote control device, such as the remote control devices 128, 148. The interest inputs 111 may be received, for example, when the user views and/or hears a moment deemed to be of interest (to the user) and enters an appropriate input in the remote control device 128, 148 to indicate the same. In some arrangements, the remote control devices 128, 148 can include a TV remote control, such as remote control 350 shown in FIG. 3, and a particular button could be designated as an interest input key 352 (visible in FIG. 3) to receive such inputs. Although the interest input key 352 is referred to herein as a "key," it should be understood that soft keys, touch screens, and/or other inputs are contemplated and are possible. The remote control 350 can send user inputs via infrared signals to a receiver, a set-top box, to other devices, and the like. The interest input key 352 on the remote control 350 can correspond to a button on the device, such as a feature button, an "up" button, a "down" button, or the like. It should be understood that other keys, touch sensitive regions, or the like can be used to provide the functionality of the interest input key 352 illustrated and described herein. Also, some embodiments of the concepts and technologies disclosed herein can enable a user or other entity to designate a button or other input to use for the interest input key 352 illustrated and described herein. Thus, the above examples are illustrative and should not be construed as being limiting in any way.

It should be further understood that custom-made or custom-configured remote control devices could be used to provide the functionality of the remote control devices 128, 148 illustrated and described herein. For example, a remote control device can be designed for use with a computer device, a set-top box or other CPE provided by a particular content delivery provider and/or content delivery system, if desired. In such an arrangement, a custom remote control device/remote control devices 128, 148 could include a special button or set of buttons configured for use with the interest application 108, such as a "check mark" or a "thumbs up" shaped button that can be configured to be the default "interest input" button. It should be further understood, however, that almost any type of input/output device can be used to provide the functionality of the remote control devices 128, 148 illustrated and described herein and/or can be configured to operate interactively with interest application 108. For example, the remote control devices 128, 148 could include a "remote control" or "interest data application," which can be implemented on a mobile device that can communicate with the computing device 102 in various ways, such as via wireless communications, in order to provide interest inputs 111 to the computing device 102. In another example, the remote control devices 128, 148 can be configured as a sensor or number of sensors that can be in communication with the computer device 102. The sensor(s) can recognize particular movements, sounds, or motions to indicate entry of an interest input 111. Because the interest inputs 111 illustrated and described herein can be received or detected in additional or alternative manners, it should be understood that these examples are illustrative, and therefore should not be construed as being limiting in any way.

Interest application 108 can be configured to identify the particular time in the program at which an interest input 111 is received from the remote control device 148. In some embodiments, the time in the program can be defined according to time index of a program and can be represented by a timeline 218 (see FIG. 2A) in a user interface. The time index of the program can be defined for a video program that corresponds to the video content 115 as sent from a content server 116. The timeline 218 can correspond to a common time index for the program as sent to multiple different computer devices, including the computing device 102 and the computing device 142 as shown in FIG. 1A. In some configurations, the time index can be established at the same time that the program is being broadcast based on the starting time of the program, such as for sporting events or other live events for which an ending time has not been specifically established. As such, a moment in the program that corresponds to an interest input 111 received from the remote control device 148 for the particular program and the identified time 224 of the interest input 111 according to the common time index can correspond to, and/or identify the same moment in the program, regardless of the particular computing device that provided the interest input 111. For instance, if an interest input 111 was received by the interest application 108 in the same program and having the same time 224 according to the time index of the program for both computing devices 102 and 142, the interest input 111 can be deemed to correspond to the same moment in the program. The interest application 108 can identify input information that describes the interest input 111 received from the remote control device 148, including the displayed program and the time 224 of the interest input 111 according to the time index of the program, and create the interest data 109 for sending the input information to the aggregator server 130. It should be understood that this example is illustrative, and therefore should not be construed as being limiting in any way.

As illustrated in FIG. 1A, both computing devices 102 and 142 can send interest data 109 to the aggregator server 130. The interest data 109 can be sent at different times, as well as repeatedly as needed depending upon when and how often a user views the program and provides the interest inputs 111. In some embodiments, the interest application 108 can send the interest data 109 as soon as, or shortly after, an interest input 111 is received. Further, in some other configurations, the interest application 108 can collect interest information from multiple interest inputs 111 that can be received for a program and send the collected information to the aggregator server 130 in periodic batches. For example, the interest application 108 can send the interest data for all interest inputs 111 received during viewing of a program up until completion of the program or until the viewer stops watching the program. In some other configurations, the interest application 108 can send the interest data 109 at a particular pre-set time or period. In one contemplated embodiment, the interest application 108 can send the interest data 109 daily (e.g., each night at 3 AM or other times when network demands can be low). This can include sending interest information for all programs viewed in the previous twenty-four hours on a particular computing device and can include information regarding all interest inputs 111 received for those programs, if desired. It should be understood that this example is illustrative, and therefore should not be construed as being limiting in any way.

Figure 1B:
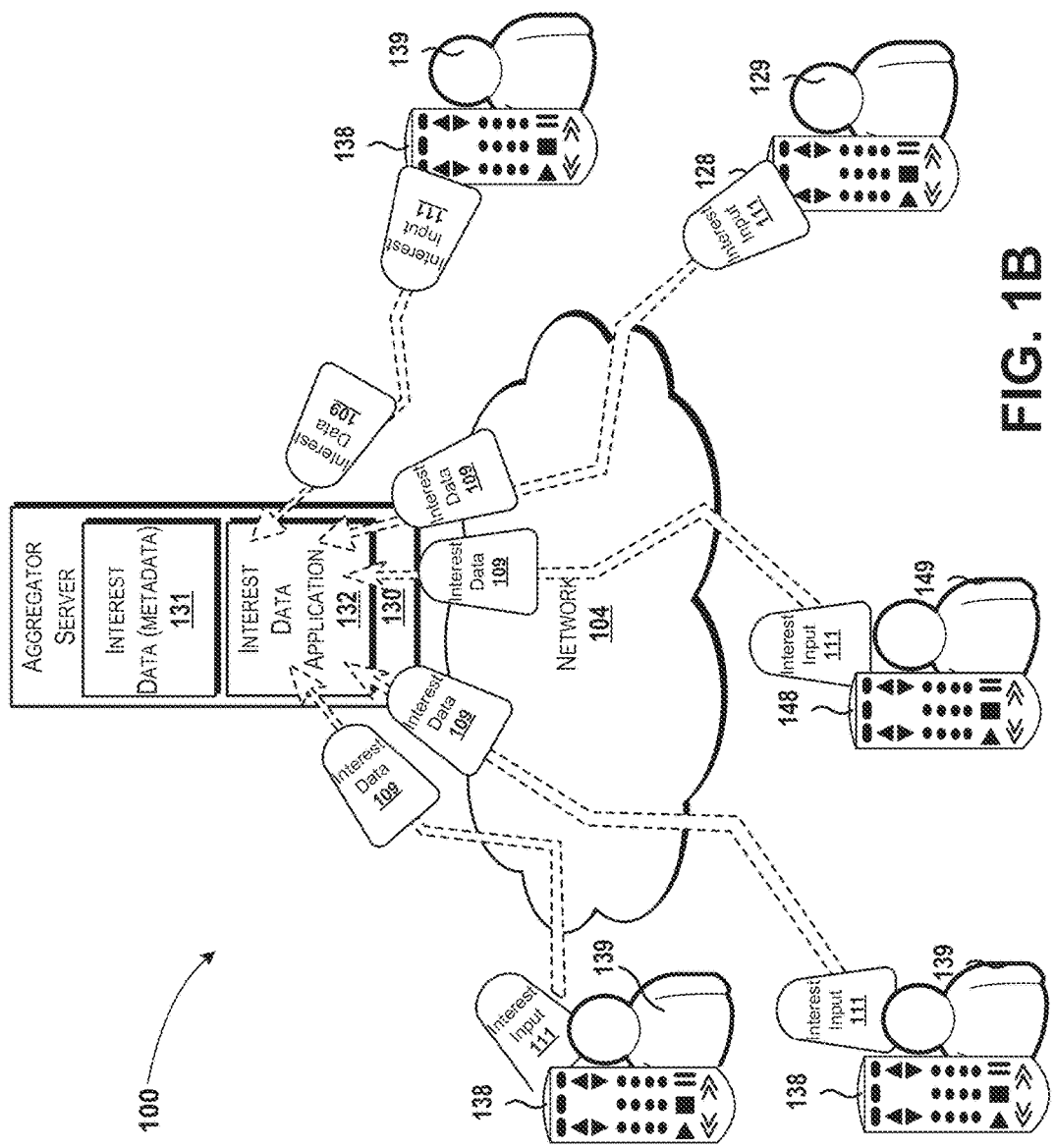
FIG. 1B shows a portion of the system diagram of FIG. 1A along with generally illustrating message flows of interest data from multiple users to the aggregator server shown in FIG. 1A, according to some illustrative embodiments of the concepts and technologies described herein.

Referring now to FIG. 1B, a portion of the operating environment 100 is shown in more detail. In particular, FIG. 1B shows the aggregator server 130, the network 104, and a number of users 129, 139 and 149 and respective remote control devices 128, 138 and 148. FIG. 1B generally illustrates a flow of interest inputs 111 from multiple viewers and their corresponding remote control devices 128, 138 and 148 according to one contemplated embodiment. The interest inputs 111 can be converted into the interest data 109 via one or more computing device 102, 142 and can be forwarded to the aggregator server 130. Thus, the aggregator server 130 can be able to receive the interest inputs 111 and interest data 109 from any number of users for a program. Thus, the interest inputs 111 can represent multiple viewpoints regarding moments of interest in a program and the amounts of interest throughout the program. The aggregator server 130 can use this information from the multiple sources and different viewers. The aggregator server 130 also can aggregate and analyze the information to determine interest information that can be added to the program according to aspects and features discussed further below.

Figure 2A:
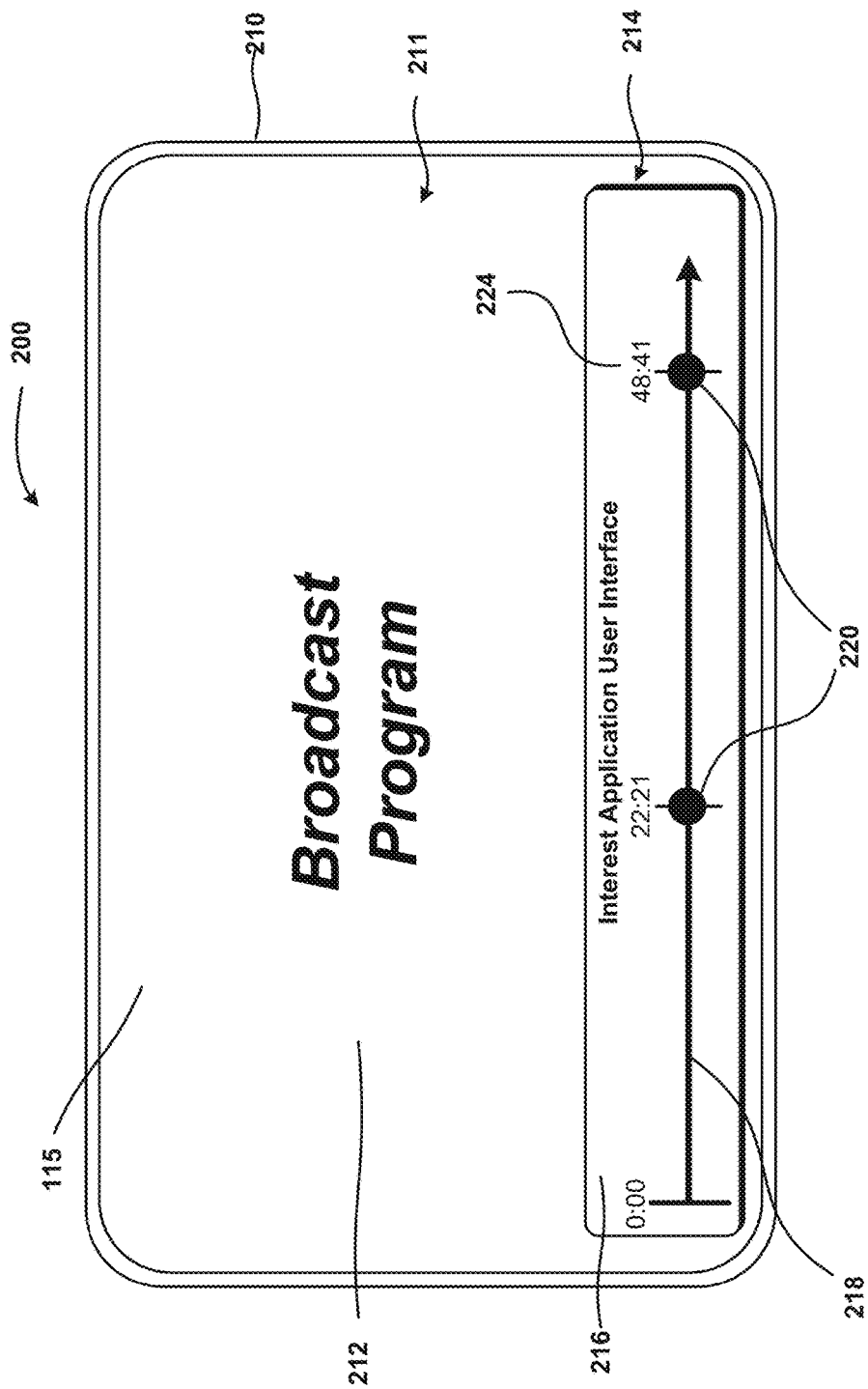
FIGS. 2A and 2B are user interface diagrams showing aspects of obtaining interest inputs, according to illustrative embodiments of the concepts and technologies described herein.

Referring now to FIG. 2A, an example user interface display 200 is shown, according to an example embodiment. The user interface display 200 can be shown on a display 210 to which the computing device 102 can be connected, in some embodiments. As discussed below, the computing device 102 and the interest application 108 can provide the interest application display data 211 including the video content 115 for display on a display region 212 of the display 210. The interest application 108 also can provide the interest application user interface 214 for display on a portion of display region 212, such as on a lower portion of the display region 212, for example. It should be understood that this example is illustrative, and therefore should not be construed as being limiting in any way. In some arrangements, the interest application user interface 214 can be provided as a transparent, partially transparent, partially opaque, or opaque overlay 216, though this is not necessarily the case. If the interest application user interface 214 is provided as a partially transparent overlay 216, portions of the video content 115 underlying the interest application user interface 214 can be viewed at the same time as the interest application user interface 214. It should be understood that this example is illustrative, and therefore should not be construed as being limiting in any way.

In the example configuration shown in FIG. 2A, the interest application user interface 214 can include a timeline 218. The timeline 218 can correspond to and/or can represent a time index of the program that corresponds to the video content being displayed on the display region 212. The interest application user interface 214 further can include a representation 220 of one or more interest input 111. As noted above, the interest input 111 can be entered by the user via the remote control device 128 (e.g., while the user is viewing the program). The representation 220 can be shown on the timeline 218 at a position thereon that can correspond to its timing within the program. In addition, the interest application user interface 214 can include the time 224 that corresponds with the moment in the program at which the user entered the particular interest input 111 according to the time index for the program. It should be understood that this example is illustrative, and therefore should not be construed as being limiting in any way.

The interest application 108 can be executed by the computing device 102 to obtain the interest application display data 211. In some embodiments of the concepts and technologies described herein, the interest application 108 can render the interest application display data 211 to present the interest application user interface 214. In some other embodiments of the concepts and technologies described herein, the interest application 108 can generate the interest application user interface 214 based on the interest application display data 211. Thus, it can be appreciated that in some embodiments the interest application 108 can generate the interest application display data 211 as data that, when rendered by the interest application 108, can present the interest application user interface 214. In some other embodiments, the interest application 108 can generate the interest application display data 211 as data that is used by the interest application 108 to generate the interest application user interface 214 illustrated and described herein. It should be understood that this example is illustrative and therefore should not be construed as being limiting in any way.

The interest application 108 can send the interest application display data 211 to the computing device 102. In some embodiments of the concepts and technologies described herein, the interest application display data 211 can be configured as renderable data that can be rendered by the computing device 102 without further analysis and/or operations. In some other embodiments of the concepts and technologies described herein, the interest application display data 211 can be configured as data points that are then analyzed and/or operated on to create a visual display of the interest application for the computing device 102 and the other devices 142. In these and other embodiments, the computing device 102 can generate and present the interest application user interface 214.

Figure 2B:
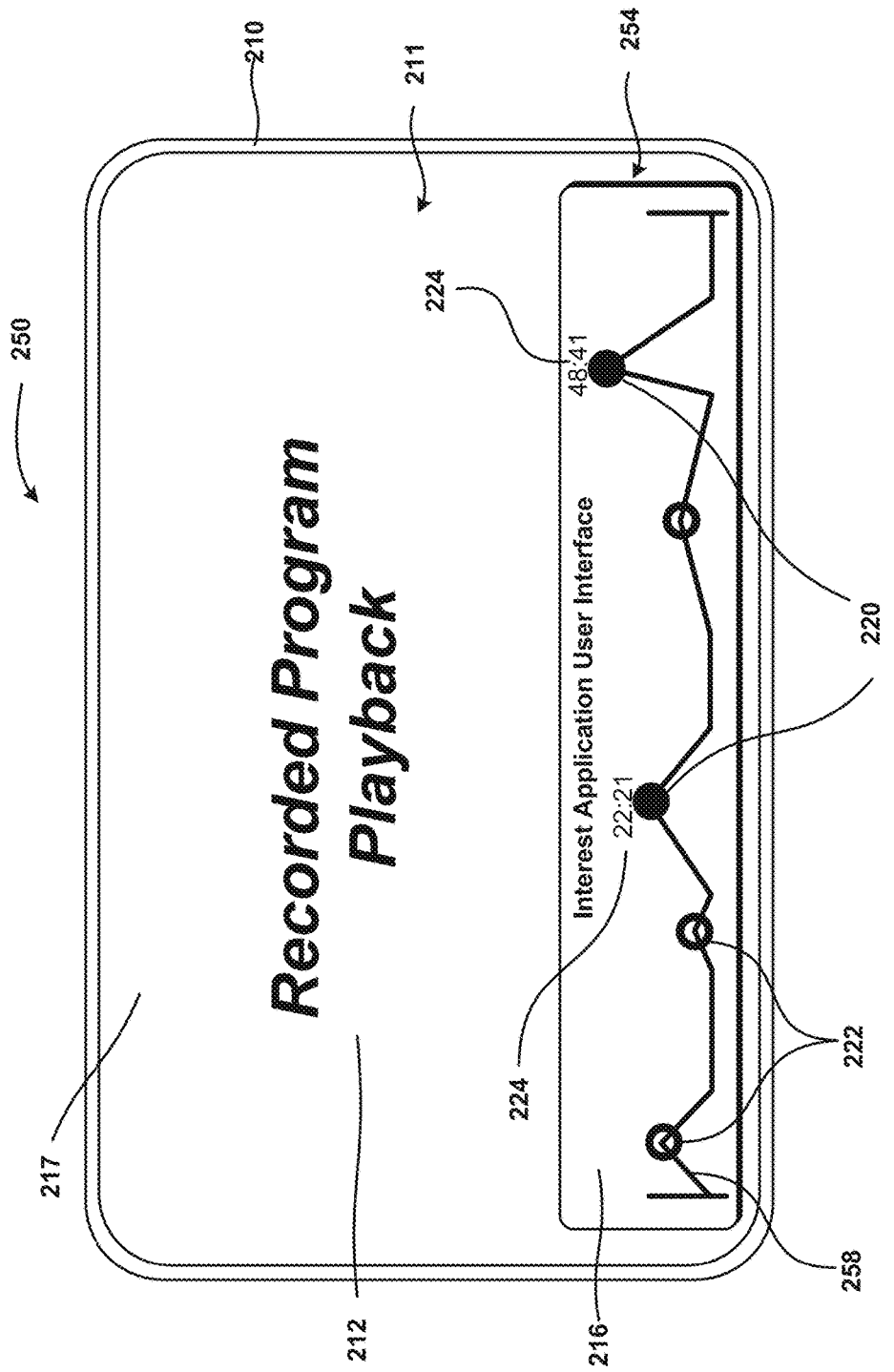

Referring now to FIG. 2B, a user interface diagram 250 providing another configuration of an example interest application user interface 254 is shown, according to another example embodiment of the concepts and technologies disclosed herein. The interest application user interface 254 can also be displayed on the display 210. The interest application user interface 254 can include the same or similar aspects and features as the user interface display 200 illustrated and described with reference to FIG. 2A and/or can include additional and/or alternative aspects or features as discussed below.

In the example of FIG. 2B, the video content 115 being displayed on the display region 212 can include recorded video content 217. The recorded video content 217 can include a recorded portion of the same program as depicted in FIG. 2A. However, in the example of FIG. 2B, the video content 217 that the user is viewing has been updated to include interest information from other users, such that initial indications 222 of the interesting portions of the program have been identified, as well as corresponding amounts of interest from those users through the program. As such, the timeline 258 in this example configuration is shown as a two-dimensional X—Y type plot in which the "Y" values represent the amounts of interest in the program video content in the program versus time and, in particular, versus the time index for the program. The timeline 258 further can differ from the timeline 218 shown in FIG. 2A in that the ending point is known in the embodiment shown in FIG. 2B and, thus, the duration of the program is known and the timeline 258 can be represented by a fixed end rather than an open ending. It should be understood that this example is illustrative, and therefore should not be construed as being limiting in any way.

Figure 3:
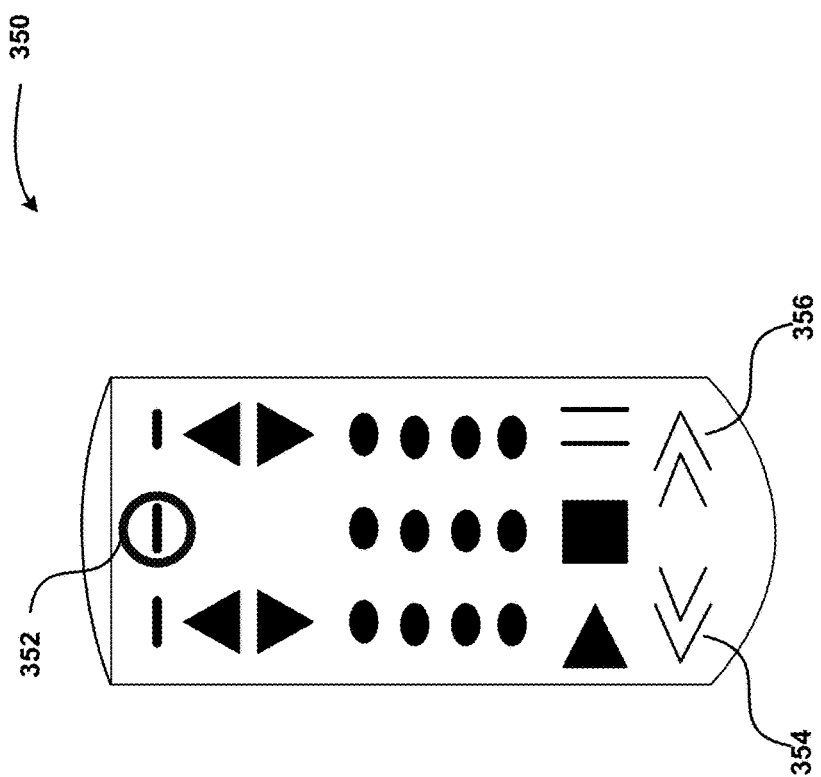
FIG. 3 shows an example input/output device according to some illustrative embodiments of the concepts and technologies described herein.

FIG. 3 shows an example input/output device such as a remote control (hereinafter referred to as a "remote control device") 350 according to some illustrative embodiments of the concepts and technologies described herein. As described above, the remote control device 350 can include a TV remote control, a remote control for a video recorder (e.g., a DVR), a remote control for a set-top box, or the like. The remote control device 350 can be used to provide the functionality illustrated and described for the remote control devices 128, 138 and 148 shown in FIGS. 1A and 1B, if desired.

The remote control device 350 can be configured to receive inputs from a user or other entity, and to provide corresponding input signals to a receiver or other interface 159 of the computing devices 102, 142 or other device, such as shown in FIG. 1A. In some embodiments, the remote control device 350 can provide input signals to the receiver via infrared control signals or via other communications media such as wireless, wired, or network communication media. As shown, the remote control device 350 can include an interest input key 352, which may be dedicated to the functionality illustrated and described herein with reference to the interest input key 352 and/or which may be a multi-function key that also provides the functionality illustrated and described herein. The remote control device 350 also can include jump keys 354 and 356, in some embodiments. It should be understood that soft keys, touch screens, and/or other inputs are contemplated and are possible.

Figure 4A:
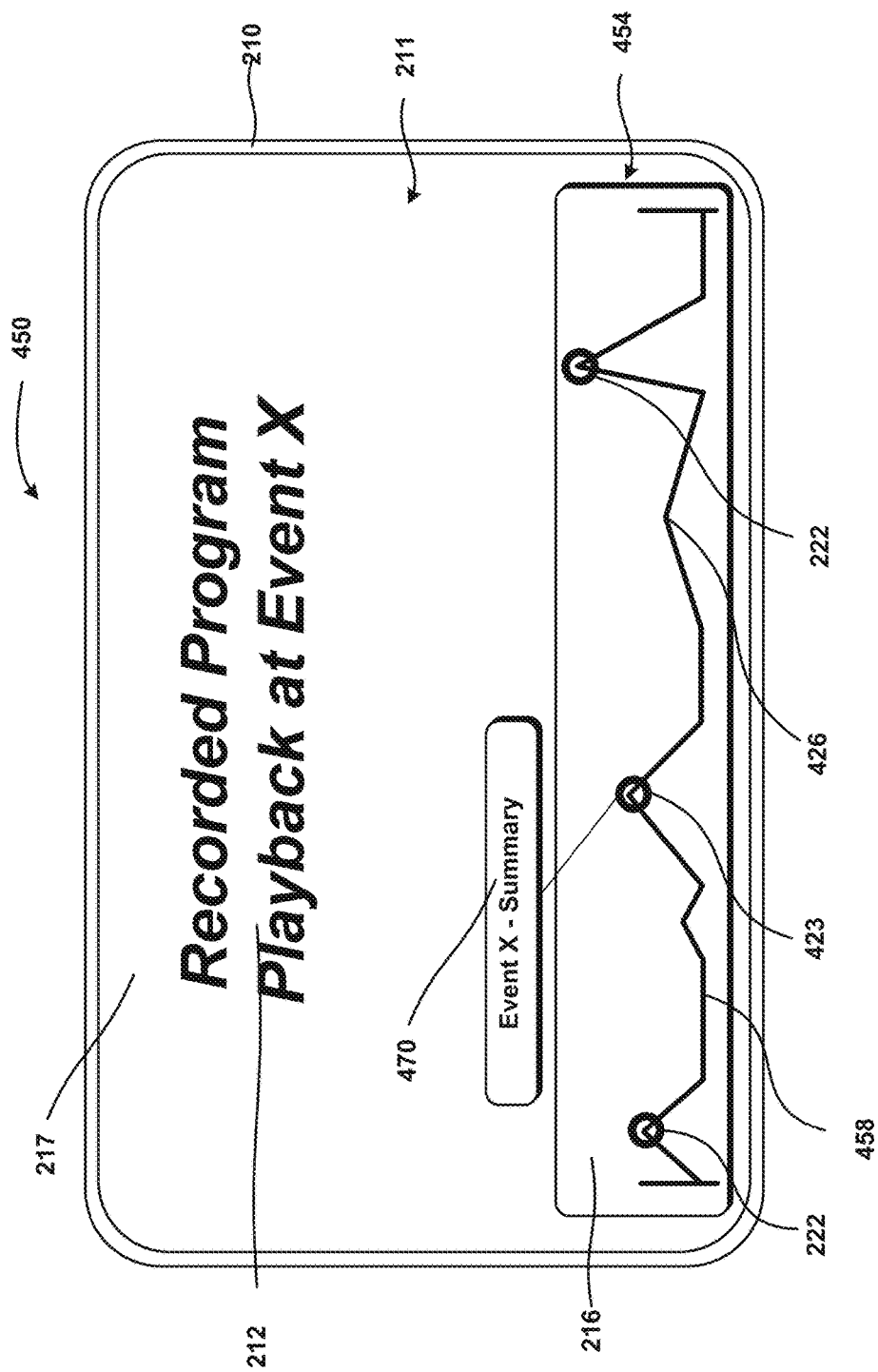
Figure 4B:
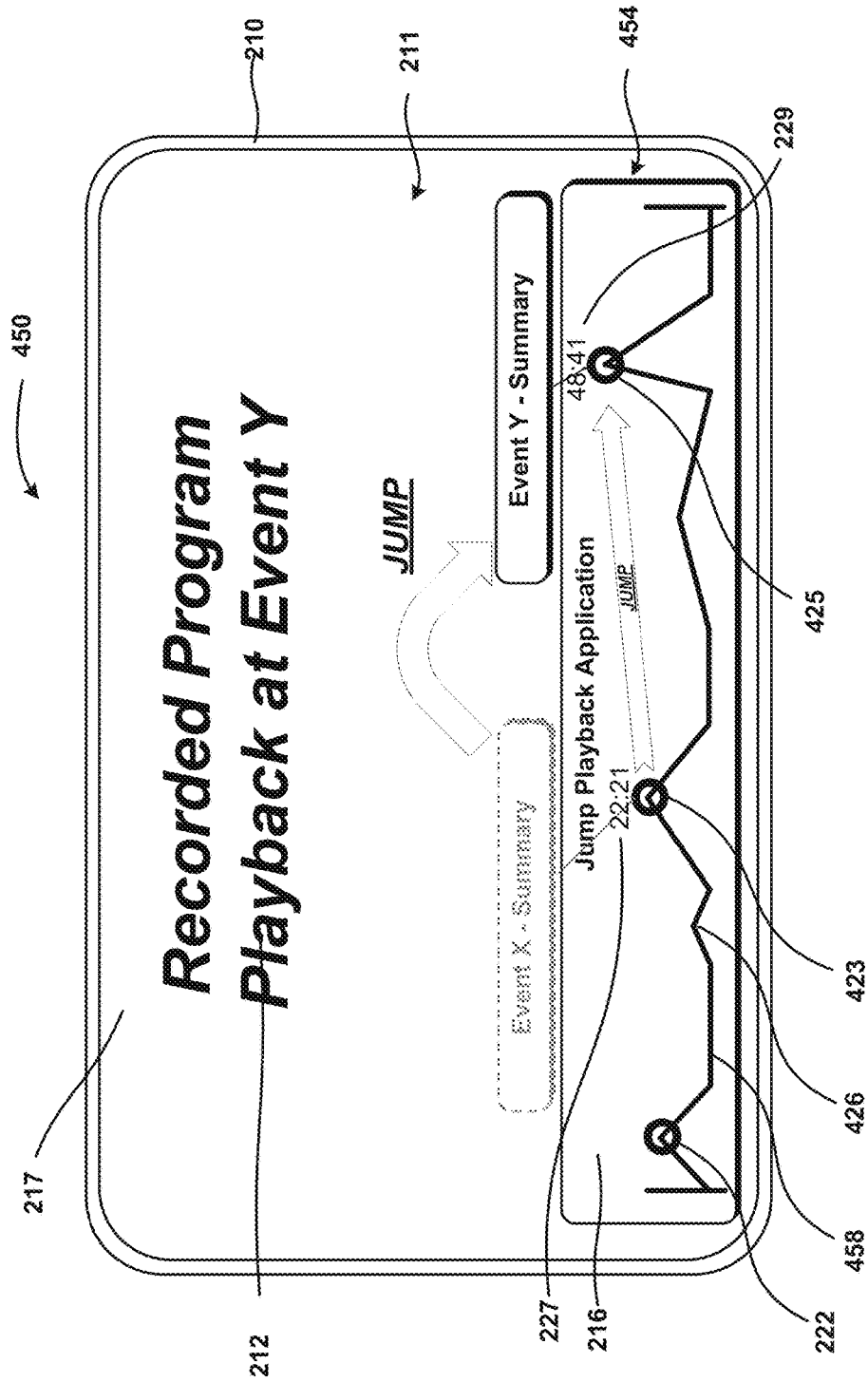

Referring now to FIGS. 4A and 4B, instances of a user interface diagram 450 providing another configuration of an example interest application user interface 454 is shown. The interest application user interface 454 can also be displayed on the video display 210. The interest application user interface 454 can include the same or similar aspects and features as the interest application user interface 254 shown in FIG. 2B and/or can differ as explained below. In the examples of FIGS. 4A and 4B, the video content being displayed on the display region 212 can include recorded video content 217 such as that shown in FIG. 2B. However, in the example of FIGS. 4A and 4B, the interest application user interface 454 can provide the user with jump functionality for jumping between indications 222 of interesting portions of the program. In the example of FIG. 4A, the user has selected a first indication 423 that corresponds to one of the interesting portions of the program. In response to detecting selection of the first indication 423, the interest application 108 has commenced playback in the display region 212 at a point in the program that corresponds to the first indication 423 and an event summary 470 is shown in the interest application user interface 454. It should be understood that this example is illustrative, and therefore should not be construed as being limiting in any way.

It is understood that the user can select an option to view the portion of the program that corresponds to the first indication 423 using various options according to aspects and features of concepts discussed herein, such as using input buttons on example remote control 350 shown in FIG. 3. For instance, the remote control 350 can include designated jump keys or buttons 354 and 356 for traversing forward and backward between portions of the program that correspond to the indications 222 and/or the first indication 423. Further, the interest application 108 can be configured to jump between the indications 222 and the first indication 423 in chronological order (relative to the program timeline 458). According to another example, one or more (or all) of the indications 222 and/or the first indication 423 can be numbered, such as Event 2 instead of Event X in FIG. 4A, which the user could enter in order to jump to and commence playback of the event. It should be understood that this example is illustrative, and therefore should not be construed as being limiting in any way.

As illustrated in FIG. 4B, playback of the recorded program can jump from a portion of the program that corresponds to the indication 423 to a portion of the program that corresponds to the indication 425. This jump can occur automatically in an automatic jump playback mode of the interest application 108, if desired. In some other embodiments according to aspects and features of concepts described herein, playback can jump from a portion of the program associated with Event X and the indication 423 to a portion of the program associated with Event Y and the indication 425, in response to the user selecting the button 356, for example, on the remote control 350 shown in FIG. 3, or in response to the user entering a number that corresponds to the indication 425. Regardless of how the request to jump from one portion of the program that corresponds to the indication of an interesting event indicated by the indication 222 to another portion of the program is received, upon receiving an input to jump between the portions of the program corresponding to the indications, the interest application 108 can act to terminate the playback of the stored portion of video content 115 corresponding to Event X and can commence playback at the beginning of the stored portion of video content 115 that corresponds to Event Y.

Referring now to FIG. 4C, an example interest application user interface 454 is shown, according to embodiments of concepts discussed herein. As noted above, the indications 222 of the interesting portions can be determined via the aggregator server 130 in some embodiments. The aggregator server 130 can aggregate a number of interest inputs included in the interest data 109 (see FIGS. 1A and 1B) and can determine the amounts of interest associated with one or more, or each of the interest inputs received. The aggregator server 130 can further identify interesting portions for which to provide the indications 222 according to the amounts of interest for each interesting portion. The interesting portions above a pre-determined threshold 475 can be identified by the aggregator server 130 via the indications 222 of the interesting portions, whereas other interesting portions 426 may not be designated via an indication 222 as an interesting portion. According to some embodiments of concepts discussed herein, a pre-determined threshold 475 can be a pre-determined number of interest inputs included in interest data 109 received from viewers of the program. According to other embodiments of concepts discussed herein, the pre-determined threshold 475 can include a pre-determined percentage of interest inputs included in the interest data 109 received from the viewers.

As further illustrated in FIG. 4C, the periods of interesting portions can be determined by the aggregator server 130 in various way according to embodiments of concepts discussed herein. For instance, a period 436 of the program that corresponds to an indication 222 of an interesting portion can include a period 436 in which the amounts of interest are above the pre-determined threshold 475. In another example, a period 438 of the program that corresponds to an indication 222 of an interesting portion can include a period 438 between changes in the amounts of interest in the program. It should be understood that these examples are illustrative and therefore should not be construed as being limiting in any way.

Figure 5:
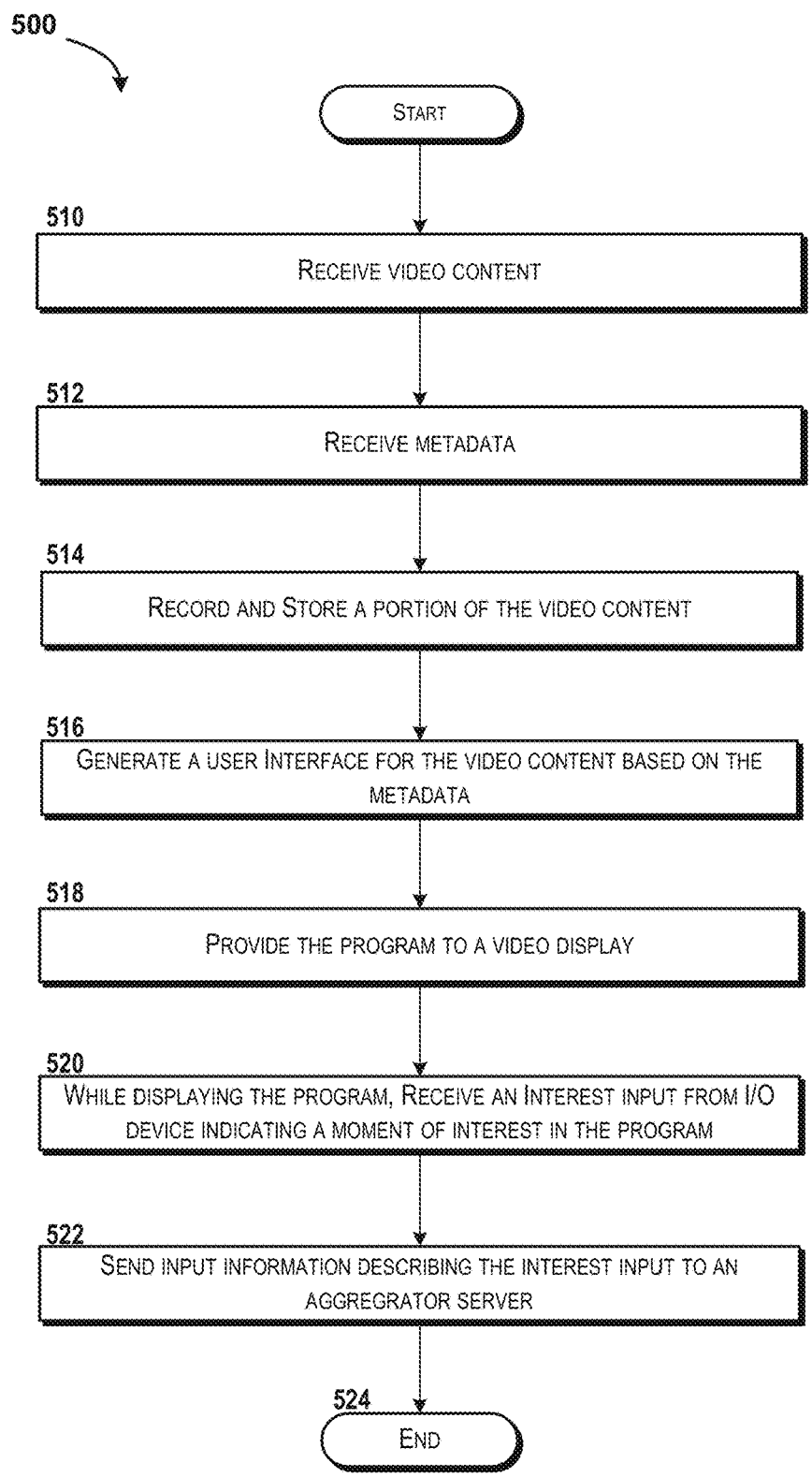
FIG. 5 is a method diagram that schematically illustrates a method for storing a portion of a program, according to some illustrative embodiments of the concepts and technologies described herein.
Figure 6:
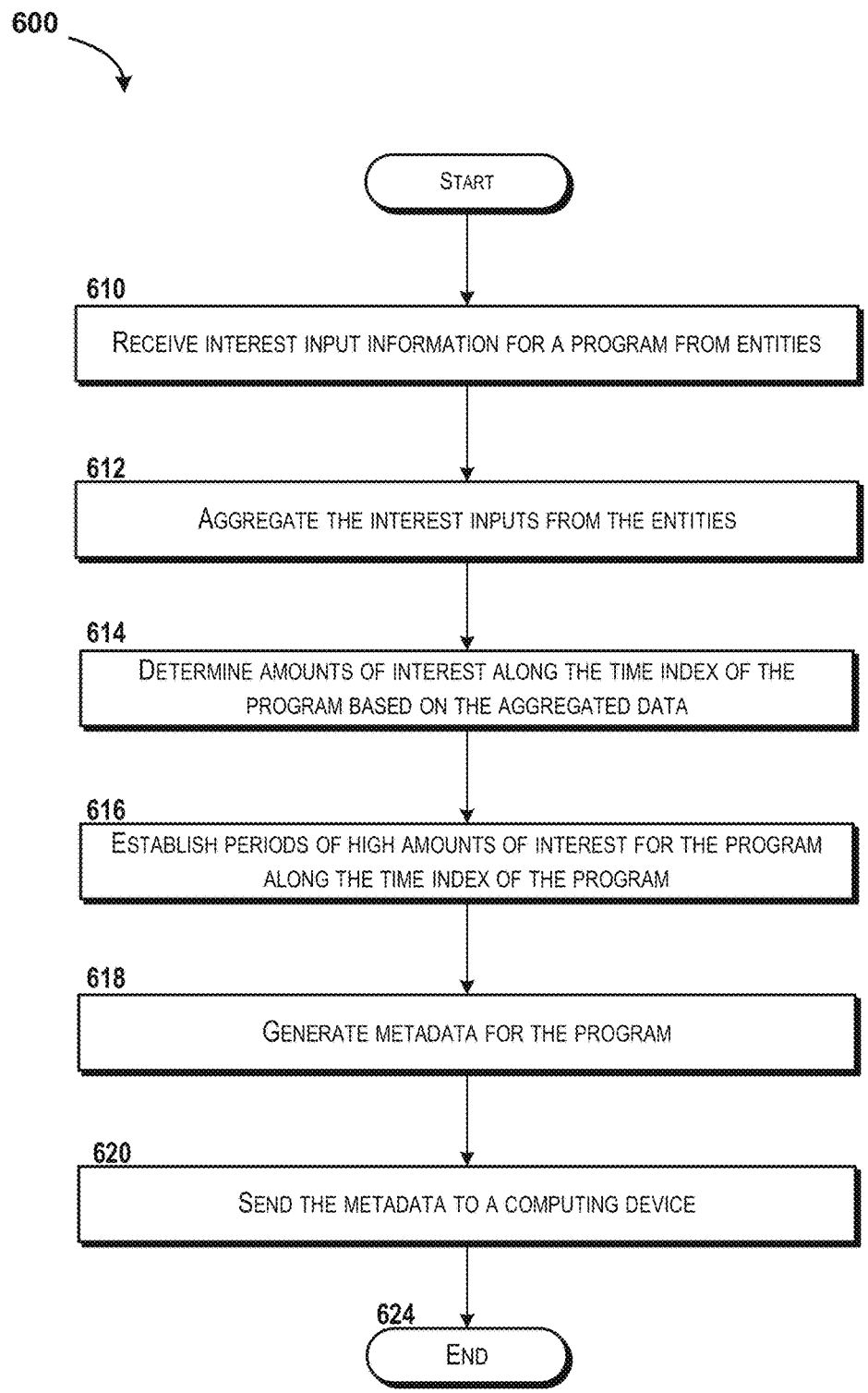
FIG. 6 is a method diagram that schematically illustrates a method for generating metadata for the program, according to some illustrative embodiments of the concepts and technologies described herein.
Figure 7:
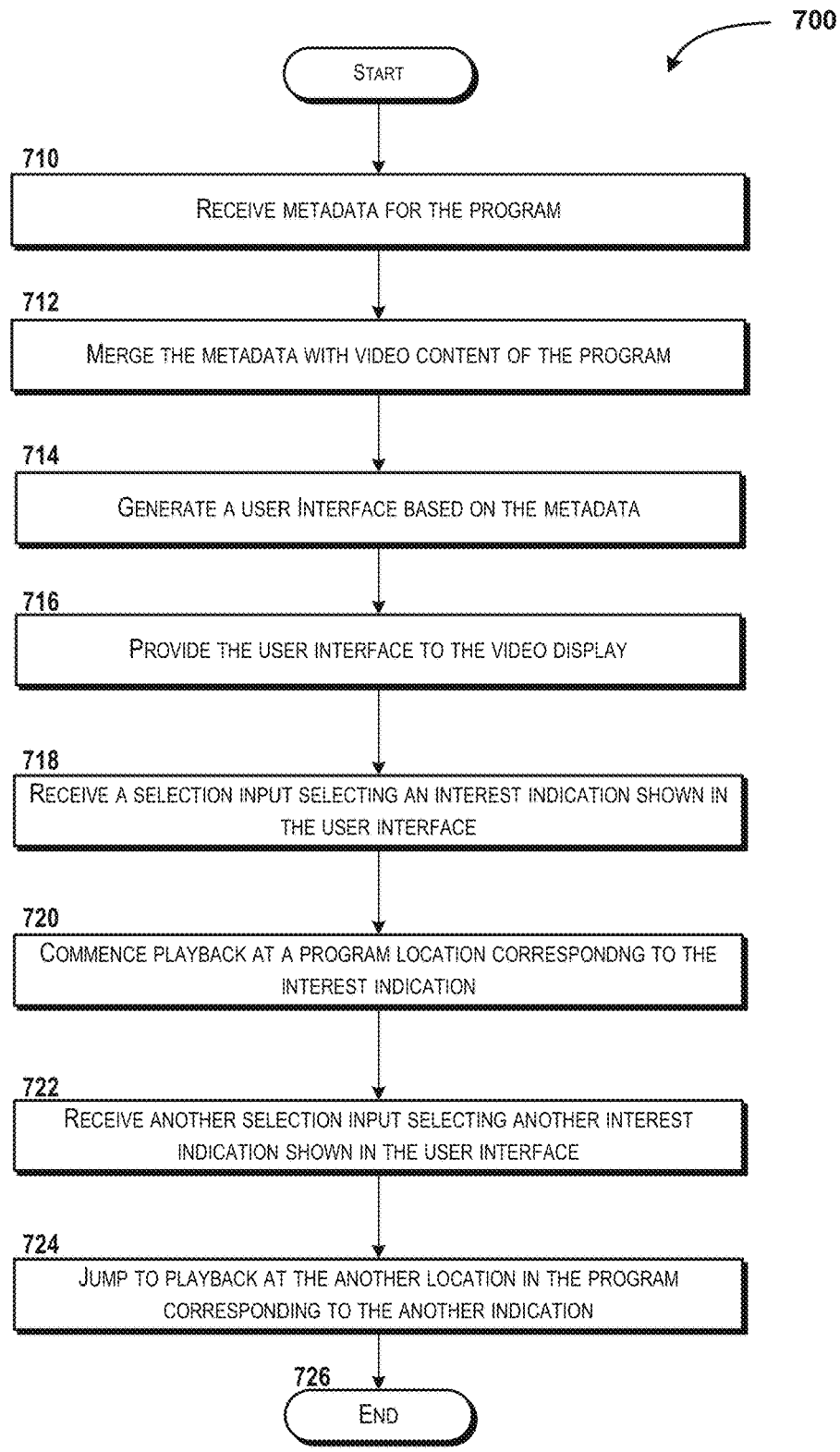
FIG. 7 is a method diagram that schematically illustrates a method for providing jump functionality, according to some illustrative embodiments of the concepts and technologies described herein.

Turning now to FIGS. 5-7, aspects of methods 500, 600, and 700 for generating and providing indications of interest and/or jump playback will be described in detail, according to illustrative embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, the server computers 116 and/or 130, and/or other devices or systems to perform one or more operations and/or causing the processor to direct other components of the computing system or device to perform one or more of the operations.

Turning now to FIG. 5, aspects of a method 500 for providing an interest application display will be described in detail, according to an illustrative embodiment. For purposes of illustrating and describing the concepts of the present disclosure, the method 500 disclosed herein is described as being performed by the computing device 102 via execution of one or more software modules such as, for example, the interest application display application 108. It should be understood that additional and/or alternative devices and/or network nodes can provide the functionality described herein via execution of one or more modules, applications, and/or other software including, but not limited to, the interest application display application 108. Thus, the illustrated embodiment is illustrative, and should not be viewed as being limiting in any way.

The method 500 begins at operation 510. At operation 510, the computing device 102 can receive video content. For example, the computing device 102 can receive, from the content server 116, the video content 115. As explained above, the video content 115 can correspond to a program, and the program can have a duration including an amount of time and can include a time index based on the amount of time.

From operation 510, the method 500 can proceed to operation 512. At operation 512, the computing device 102 can receive, from the aggregator server 130, metadata. According to various embodiments, the metadata received in operation 512 can include metadata that is associated with the program that corresponds to the video content 115 received in operation 510. The metadata can include data that defines a first amount of interest in the program at a first period within the program along the time index of the program, and a second amount of interest in the program at a second period within the program along the time index of the program.

From operation 512, the method 500 can proceed to operation 514. At operation 514, the computing device 102 can record and store a portion of the video content 115 for the program. It should be understood that in some embodiments, the video content 115 can be downloaded by the computing device 102 and therefore may not be "recorded" per se. It should be understood that this example is illustrative, and therefore should not be construed as being limiting in any way.

From operation 514, the method 500 can proceed to operation 516. At operation 516, computing device 102 can generate, based on the metadata, a user interface. The user interface can include a representation of the duration of the program and a first indication at a first location on the representation of the duration. The first indication can represent the first amount of interest and the first location can correspond to the first period of interest. The user interface can also include a second indication at a second location on the representation of the duration. The second indication can represent the second amount of interest and the second location can correspond to the second period.

From operation 516, the method 500 can proceed to operation 518. At operation 518, the computing device 102 can provide the video content 115 for the program to a video display. Thus, operation 518 can include displaying the program, though this is not necessarily the case.

From operation 518, the method 500 can proceed to operation 520. At operation 520, the computing device 102 can receive an interest input 111 from an input/output device. The interest input 111 can indicate a moment of interest in the program and can define or identify a time at which the moment of interest occurs with respect to the time index of the program.

From operation 520, the method 500 can proceed to operation 522. At operation 522, the computing device 102 can send, to aggregator server 130, input information. The input information can describe the interest input 111 received in operation 520 and the input period along the time index for the program.

From operation 522, the method 500 can proceed to operation 524. The method 500 can end at operation 524.

Turning now to FIG. 6, aspects of a method 600 for providing metadata for an interest application display will be described in detail, according to an illustrative embodiment. For purposes of illustrating and describing the concepts of the present disclosure, the method 600 disclosed herein is described as being performed by the aggregator server 130 via execution of one or more software modules such as, for example, interest data application 132. It should be understood that this example is illustrative, and therefore should not be construed as being limiting in any way.

The method 600 can begin at operation 610. At operation 610, the aggregator server 130 can receive, from a number of computing devices, information that can describe one or more interest inputs. The interest inputs 111 can relate to a program and one or more, or each of the interest inputs 111 can indicate a moment of interest in the program at a corresponding input period along the time index of the program.

From operation 610, the method 600 can proceed to operation 612. At operation 612, the aggregator server 130 can aggregate the number of interest inputs in the information.

From operation 612, the method 600 can proceed to operation 614. At operation 614, the aggregator server 130 can determine amounts of interest in the program. As noted above, an associated time for the amounts of interest can be determined, where the associated time can be defined with respect to the time index of the program.

From operation 614, the method 600 can proceed to operation 616. At operation 616, the aggregator server 130 can establish one or more periods of high amounts of interest in the program. The periods can also be defined with respect to the time index of the program. One or more, or each, of the number of periods can include a starting point along the time index, a period length, and an amount of interest for the period.

From operation 616, the method 600 can proceed to operation 618. At operation 618, the aggregator server 130 can create the metadata 131 for the program. The metadata 131 can include data that can define amounts of interest in the program at corresponding time periods. The time periods can be defined with reference to the time index of the program.

From operation 618, the method 600 can proceed to operation 620. At operation 620, the aggregator server 130 can send the metadata 131 for the program to computing device 102 and other computing devices.

From operation 620, the method 600 can proceed to operation 624. The method can end at operation 624.

Turning now to FIG. 7, aspects of a method 700 for providing playback functionality will be described in detail, according to an illustrative embodiment. For purposes of illustrating and describing the concepts of the present disclosure, the method 700 disclosed herein is described as being performed by the computing device 102 via execution of one or more software modules such as, for example the interest application 108.

The method 700 begins at operation 710. At operation 710, the computing device 102 can receive metadata for the program from the aggregator server 130.

From operation 710, the method 700 can proceed to operation 712. At operation 712, the computing device 102 can merge the metadata 131 received from the aggregator server 130 with the stored portion of video content 115 that can correspond to the program. As used herein, "merging" content does not necessarily mean that the metadata 131 and the video content 115 are combined into a single data file. Rather, according to various embodiments of the concepts and technologies disclosed herein, "merging" is used to refer to determining, for video content 115 and based on reference to the metadata 131, levels of interest at various times. It should be understood that this example is illustrative, and therefore should not be construed as being limiting in any way.

From operation 712, the method 700 can proceed to operation 714. At operation 714, the computing device 102 can generate the interest application user interface 454. The interest application user interface 454 can include a program timeline 458 that can be based on the time index. The program timeline 458 can show one or more indications 423, 425 at one or more respective locations on the program timeline 458. The indications 423, 425 can include interest at the associated times depicted on the program timeline 458 (e.g., the indications 423, 425) and can be provided as selectable items in the interest application user interface 454.

From operation 714, the method 700 can proceed to operation 716. At operation 716, the computing device 102 can provide (e.g., output) the interest application user interface 454 to the video display. In some embodiments, the interest application user interface 454 can be provided with a stored portion of the video content 115 that corresponds to the program.

From operation 716, the method 700 can proceed to operation 718. At operation 718, the computing device 102 can receive a selection input. The selection input can indicate selection of interest indication 423 shown in the interest application user interface 454.

From operation 718, the method 700 can proceed to operation 720. At operation 720, the computing device 102 can commence playback of the program at a time in the program that corresponds to the selected interest indication 423.

From operation 720, the method 700 can proceed to operation 722. At operation 722, the computing device 102 can receive another selection input. The other selection input can correspond to selecting another interest indication 425 shown in the interest application user interface 454.

From operation 722, the method 700 can proceed to operation 724. At operation 724, in response to receiving the other selection as shown in operation 722, the computing device 102 can jump to playback at a time that corresponds to the other selection. Thus, as explained above, the computer device 102 can commence playback at a point in the program that corresponds to the other indication.

From operation 724, the method 700 can proceed to operation 726. The method 700 can end at operation 726.

Figure 8:
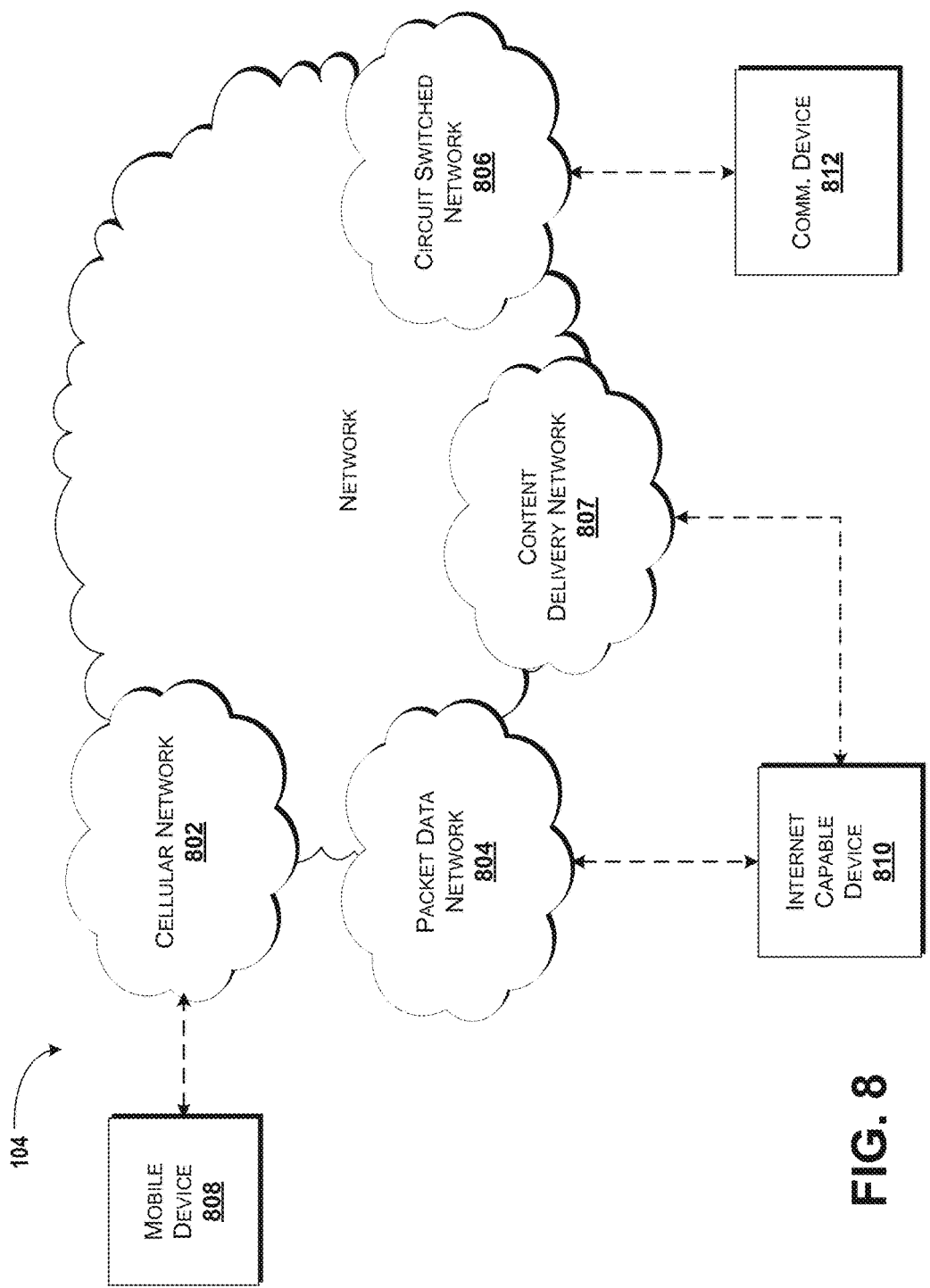
FIG. 8 schematically illustrates a network, according to an illustrative embodiment of the concepts and technologies described herein.

Turning now to FIG. 8, additional details of the network 104 are illustrated, according to an illustrative embodiment. The network 104 can include a cellular network 802, a packet data network 804, for example, the Internet, a circuit switched network 806, for example, a publicly switched telephone network ("PSTN"), and a content delivery network 807, for example a television delivery network, or the like, which can complement or traverse one or more of the cellular network 802, the packet data network 804, and/or the circuit switched network 806. The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the networks 802, 804, 806. It should be appreciated that substantially all of the functionality described with reference to the network 104 can be performed by the cellular network 802, the packet data network 804, and/or the circuit switched network 806, alone or in combination with other networks, network elements, and the like.

Figure 9:
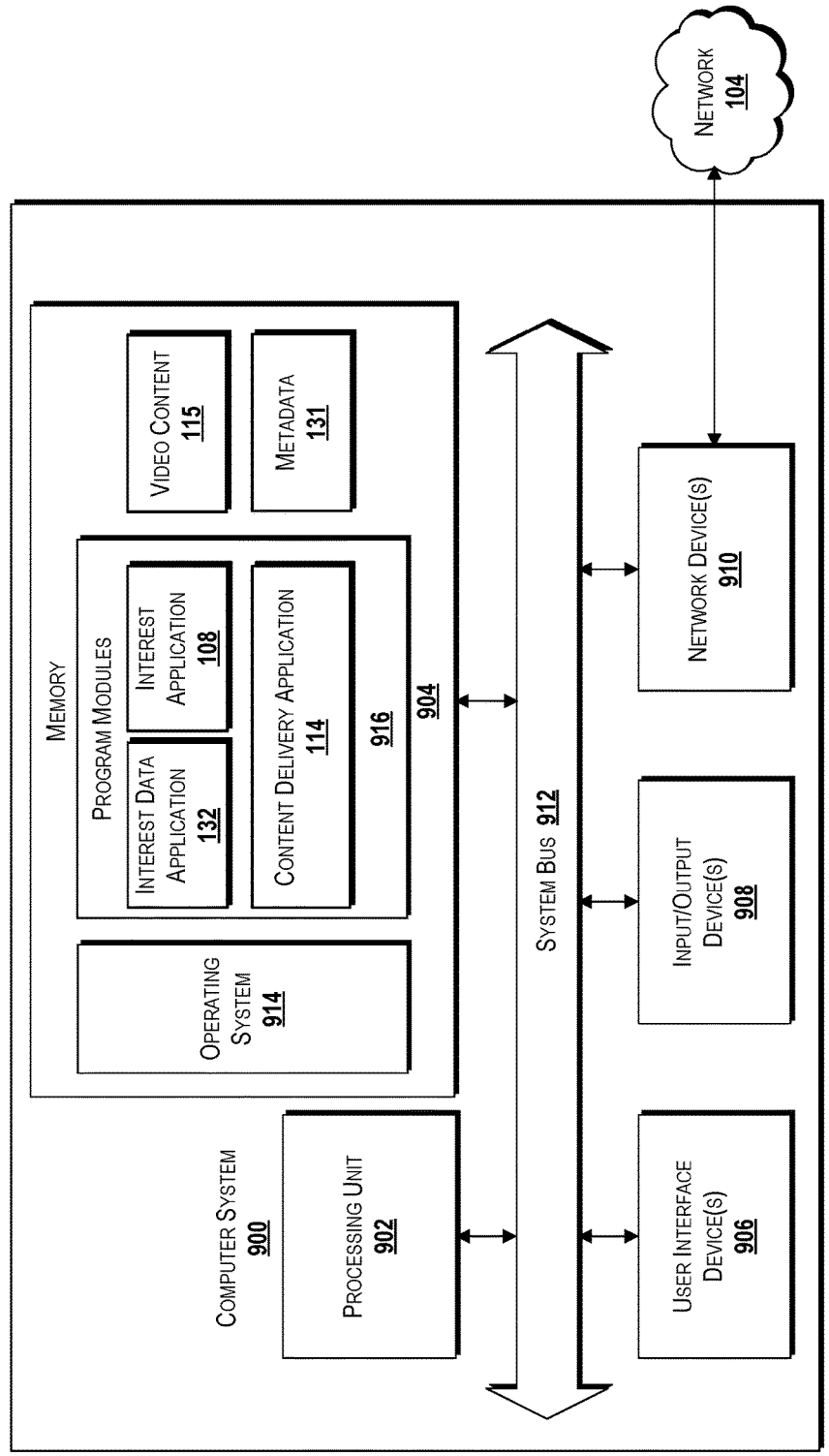
FIG. 9 is a block diagram illustrating an example computing device, according to some illustrative embodiments of the concepts and technologies described herein.

Referring now to FIG. 9, a block diagram is shown illustrating a computer system 900 configured to provide the functionality described herein for generating and providing relative interest application indicators, in accordance with various embodiments of the concepts and technologies disclosed herein. In some embodiments, the architecture shown in FIG. 9 can correspond to the devices illustrated and described herein with respect to the computing device 102, the aggregator server 130, the content server 116, and/or the computing device 142, though this is not necessarily the case. The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916, which can include the interest application 108 and/or the interest data application 132. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 can include the interest application 108, the content delivery application 114, and/or the interest data application 132. These and/or other programs can be embodied in computer-readable media containing instructions that, when executed by the processing unit 902, perform one or more of the methods 500, 600, and 700 described in detail above with respect to FIGS. 5-7. According to embodiments, the program modules 916 may be embodied in hardware, software, firmware, or any combination thereof. Although not shown in FIG. 9, it should be understood that the memory 904 also can be configured to store the interest application data, interest application display data, user interface data, the interest input 111, the interest data 109, the metadata 131, the video content 115, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for generating and providing relative interest application indicators have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising:
receiving, from a first server, video content that corresponds to a program, wherein the program has a duration comprising an amount of time,
receiving, from a second server, metadata associated with the program, wherein the metadata comprises data that defines a first amount of interest in the program associated with a first time period and defines a second amount of interest in the program associated with a second time period,
recording a portion of the video content,
storing the portion of the video content,
merging the metadata received from the second server with the video content,
generating, based on the metadata, for a video display, a user interface that comprises
a timeline representing the duration,
a first distribution curve that represents the first amount of interest, wherein the first distribution curve covers the first time period that specifies a start time along the timeline for the first amount of interest, and
a second distribution curve that represents the second amount of interest, wherein the second distribution curve covers the second time period that specifies a start time along the timeline for the second amount of interest, and
presenting, on the video display, the user interface such that the timeline, the first distribution curve, and the second distribution curve are provided during playback of the portion of the video content on the video display.

2. The device of claim 1, wherein the first server comprises a content server, and wherein the second server comprises an aggregator server.

3. The device of claim 2, wherein the user interface further comprises a playback indicator that includes a selectable indication of an amount of interest at a time along the timeline.

4. The device of claim 1, wherein the first amount of interest is based on the second server aggregating a plurality of interest inputs corresponding to the first time period along the timeline, and wherein the second amount of interest is based on the second server aggregating a plurality of interest inputs corresponding to the second time period along the timeline.

5. The device of claim 1, wherein the operations further comprise:
providing the user interface and the video content associated with the program to the video display,
receiving, from a remote control device, an interest input associated with the program, wherein the interest input indicates an interest in the program,
determining a time period along the timeline corresponding to the interest input, and
sending, to the second server, the interest input and the time period along the timeline corresponding to the interest input.

6. The device of claim 5, wherein the operations further comprise:

receiving a selection input corresponding to a first indication of interest for the first distribution curve or a second indication of interest for the second distribution curve, and
in response to receiving the selection input corresponding to one of the first indication or the second indication, commencing playback of the video content of the program at a beginning of the first time period or the second time period based on the selection input.

7. The device of claim 6, wherein the operations further comprise:
receiving a jump selection input that identifies another time period along the timeline, and
in response to receiving the jump selection input,
terminating playback of the video content, and
commencing playback at a beginning of the another time period along the timeline.

8. A method comprising:
receiving, at a device, from a first server, video content that corresponds to a program, wherein the program has a duration comprising an amount of time;
receiving, at the device, from a second server, metadata associated with the program, wherein the metadata comprises data that defines a first amount of interest in the program associated with a first time period and defines a second amount of interest in the program associated with a second time period;
recording, at the device, a portion of the video content;
storing, at the device, the portion of the video content;
merging, at the device, the metadata received from the second server with the video content;
generating, at the device, based on the metadata, a user interface that comprises,
a timeline representing the duration,
a first distribution curve that represents the first amount of interest, wherein the first distribution curve covers the first time period that specifies a start time along the timeline for the first amount of interest, and
a second distribution curve that represents the second amount of interest, wherein the second distribution curve covers the second time period that specifies a start time along the timeline for the second amount of interest; and
presenting, at the device on a video display, the user interface such that the timeline, the first distribution curve, and the second distribution curve are provided during playback of the portion of the video content on the video display.

9. The method of claim 8, wherein the first server comprises a content server, and wherein the second server comprises an aggregator server.

10. The method of claim 9, wherein the user interface further comprises a playback indicator that includes a selectable indication of an amount of interest at a time along the timeline.

11. The method of claim 8, wherein the first amount of interest is based on the second server aggregating a plurality of interest inputs corresponding to the first time period along the timeline, and wherein the second amount of interest is based on the second server aggregating a plurality of interest inputs corresponding to the second time period along the timeline.

12. The method of claim 8, further comprising:
providing the user interface and the video content associated with the program to the video display;

receiving, from a remote control device, an interest input associated with the program, wherein the interest input indicates an interest in the program;

determining a time period along the timeline corresponding to the interest input; and sending, to the second server, the interest input and the time period along the timeline corresponding to the interest input.

13. The method of claim 12, further comprising:

receiving, at the device, a selection input corresponding to a first indication of interest for the first distribution curve or a second indication of interest for the second distribution curve; and in response to receiving the selection input corresponding to one of the first indication or the second indication, commencing playback of the video content of the program at a beginning of the first time period or the second time period based on the selection input.

14. The method of claim 13, further comprising:

receiving, at the device, a jump selection input that identifies another time period along the timeline; and in response to receiving the jump selection input,
    terminating, at the device, playback of the video content, and
    commencing, at the device, playback at a beginning of the another time period along the timeline.

15. A computer storage medium having computer-executable instructions stored thereon that, when executed by a processor, cause the processor to perform operations comprising:

receiving, at a device, from a first server, video content that corresponds to a program, wherein the program has a duration comprising an amount of time, receiving, at the device, from a second server, metadata associated with the program, wherein the metadata comprises data that defines a first amount of interest in the program associated with a first time period and defines a second amount of interest in the program associated with a second time period, recording, at the device, a portion of the video content, storing, at the device, the portion of the video content, merging, at the device, the metadata received from the second server with the video content, generating, at the device, based on the metadata, a user interface that comprises,
    a timeline representing the duration,
    a first distribution curve that represents the first amount of interest, wherein the first distribution curve covers the first time period that specifies a start time along the timeline for the first amount of interest, and
    a second distribution curve that represents the second amount of interest, wherein the second distribution curve covers the second time period that specifies a start time along the timeline for the second amount of interest, presenting, at the device on a video display, the user interface such that the timeline, the first distribution curve, and the second distribution curve are provided during playback of the portion of the video content on the video display.

16. The computer storage medium of claim 15, wherein the first server comprises a content server, and wherein the second server comprises an aggregator server.

17. The computer storage medium of claim 15, wherein the first amount of interest is based on the second server aggregating a plurality of interest inputs corresponding to the first time period along the timeline, and wherein the second amount of interest is based on the second server aggregating a plurality of interest inputs corresponding to the second time period along the timeline.

18. The computer storage medium of claim 15, wherein the computer-executable instructions, when executed by the processor, cause the processor to perform further operations comprising:

providing the user interface and the video content associated with the program to the video display, receiving, from a remote control device, an interest input associated with the program, wherein the interest input an interest in the program, determining a time period along the timeline corresponding to the interest input, and sending, to the second server, the interest input and the time period along the timeline corresponding to the interest input.

19. The computer storage medium of claim 18, wherein the computer-executable instructions, when executed by the processor, cause the processor to perform further operations comprising:

receiving a selection input corresponding to a first indication of interest for the first distribution curve or a second indication of interest for the second distribution curve, and in response to receiving the selection input corresponding to one of the first indication or the second indication, commencing playback of the video content of the program at a beginning of the first time period or the second time period based on the selection input.

20. The computer storage medium of claim 19, wherein the computer-executable instructions, when executed by the processor, cause the processor to perform further operations comprising:

receiving, at the device, a jump selection input that identifies indicating a preference to jump to another time period along the timeline, and in response to receiving the jump selection input,
    terminating, at the device, playback of the video content, and
    commencing, at the device, playback at a beginning of the another time period along the timeline.

* * * * *